US010552518B2

(12) United States Patent
Lund et al.

(10) Patent No.: US 10,552,518 B2
(45) Date of Patent: *Feb. 4, 2020

(54) ADMINISTRATION OF WEB PAGE

(71) Applicant: Cable Television Laboratories, Inc., Louisville, CO (US)

(72) Inventors: Robert M. Lund, Boulder, CO (US); Steven E. Johnson, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/478,975

(22) Filed: Apr. 4, 2017

(65) Prior Publication Data

US 2017/0205974 A1 Jul. 20, 2017

Related U.S. Application Data

(63) Continuation of application No. 13/922,386, filed on Jun. 20, 2013, now Pat. No. 9,613,011, which is a continuation-in-part of application No. 13/865,030, filed on Apr. 17, 2013, now Pat. No. 9,832,178, which is a continuation-in-part of application No.
(Continued)

(51) Int. Cl.
*G06F 17/00* (2019.01)
*G06F 17/22* (2006.01)
*G06F 3/0484* (2013.01)
*G06F 3/0482* (2013.01)
*H04N 21/41* (2011.01)
*H04N 21/436* (2011.01)
*H04N 21/4782* (2011.01)
(Continued)

(52) U.S. Cl.
CPC ........ *G06F 17/2247* (2013.01); *G06F 3/0482* (2013.01); *G06F 3/0484* (2013.01); *H04N 21/4126* (2013.01); *H04N 21/436* (2013.01); *G06F 3/048* (2013.01); *H04L 67/02* (2013.01); *H04N 21/4782* (2013.01)

(58) Field of Classification Search
CPC ...... G06F 3/00; G06F 3/0482; G06F 3/04883; G06F 17/2247; G06F 3/0484; G06F 3/048; H04N 21/4126; H04N 21/4312; H04N 21/436; H04N 21/625; H04N 21/633; H04N 21/637; H04N 21/8545; H04N 21/4782; H04L 67/02
USPC ....................................................... 715/234
See application file for complete search history.

(56) References Cited

U.S. PATENT DOCUMENTS 6,253,228 B1    6/2001    Ferris et al.
6,295,551 B1    9/2001    Roberts et al.
(Continued)

OTHER PUBLICATIONS

How Web Browsers Work, Wayback machine.
International Search Report (ISR) and Written Opinion of corresponding PCT application.

*Primary Examiner* — Cesar B Paula
*Assistant Examiner* — David Faber
(74) *Attorney, Agent, or Firm* — Great Lakes Intellectual Property, PLLC

(57) ABSTRACT

Manipulation of a Web page displayed through a first device as a function of user interaction with a second device is contemplated. The manipulation may include operating the second device as a touchscreen or other gesture-based controllable device and automatically providing corresponding navigation within the Web page as a function of interactions registered through the second device.

16 Claims, 18 Drawing Sheets

Related U.S. Application Data

13/721,356, filed on Dec. 20, 2012, now Pat. No. 9,639,623.

(51) Int. Cl.
*H04L 29/08* (2006.01)
*G06F 3/048* (2013.01)

(56) References Cited

U.S. PATENT DOCUMENTS

| | | |
|---|---|---|
| 6,763,226 B1 | 7/2004 | McZeal |
| 6,938,212 B2 | 8/2005 | Nakamura |
| 7,127,676 B2 | 10/2006 | Linsey et al. |
| 7,149,776 B1 | 12/2006 | Roy et al. |
| 7,370,269 B1 | 5/2008 | Prabhu |
| 7,904,061 B1 | 3/2011 | Zaffino |
| 7,930,721 B1 | 4/2011 | Hernes |
| 8,225,191 B1 | 7/2012 | Kalman |
| 8,225,197 B1 | 7/2012 | Szewczyk |
| 8,799,757 B2 | 8/2014 | Jewsbury |
| 2002/0138624 A1 | 9/2002 | Esenther |
| 2002/0152464 A1 | 10/2002 | Kitsukawa |
| 2003/0025732 A1 | 2/2003 | Prichard |
| 2003/0220989 A1 | 11/2003 | Tsuji et al. |
| 2004/0025171 A1 | 2/2004 | Barinov et al. |
| 2004/0055018 A1 | 3/2004 | Stone |
| 2005/0044145 A1 | 2/2005 | Quinn et al. |
| 2005/0091572 A1* | 4/2005 | Gavrilescu ............ G06F 16/954 715/205 |
| 2005/0138122 A1 | 6/2005 | Boehringer et al. |
| 2005/0246422 A1 | 11/2005 | Laning |
| 2005/0262231 A1 | 11/2005 | Lowe et al. |
| 2005/0289156 A1 | 12/2005 | Maryka et al. |
| 2007/0300252 A1 | 12/2007 | Acharya |
| 2009/0037517 A1 | 2/2009 | Frei |
| 2009/0233593 A1 | 9/2009 | Ergen |
| 2009/0271713 A1* | 10/2009 | Stull ...................... G06Q 10/10 715/753 |
| 2010/0064332 A1 | 3/2010 | Krikorian et al. |
| 2010/0135279 A1 | 6/2010 | Petersson |
| 2010/0250497 A1* | 9/2010 | Redlich ................. F41H 13/00 707/661 |
| 2010/0306642 A1 | 12/2010 | Lowet |
| 2011/0022943 A1 | 1/2011 | Bou-Ghannam et al. |
| 2011/0061080 A1 | 3/2011 | Hill |
| 2011/0191677 A1* | 8/2011 | Morris ...................... G06F 3/00 715/716 |
| 2011/0209177 A1 | 8/2011 | Sela |
| 2011/0252356 A1* | 10/2011 | Morris .................... G06F 9/451 715/772 |
| 2012/0005311 A1 | 1/2012 | Livingston |
| 2012/0054616 A1* | 3/2012 | Mittal ............. H04N 21/41407 715/722 |
| 2012/0173966 A1 | 7/2012 | Powell |
| 2012/0278699 A1 | 11/2012 | Benjamin et al. |
| 2012/0293605 A1* | 11/2012 | Seferian ................ H04N 7/147 348/14.08 |
| 2012/0311654 A1 | 12/2012 | Dougherty |
| 2015/0149916 A1* | 5/2015 | Mendez ............ G06F 17/30873 715/738 |
| 2016/0205431 A1* | 7/2016 | Avedissian ............ G06F 3/0481 725/37 |

\* cited by examiner

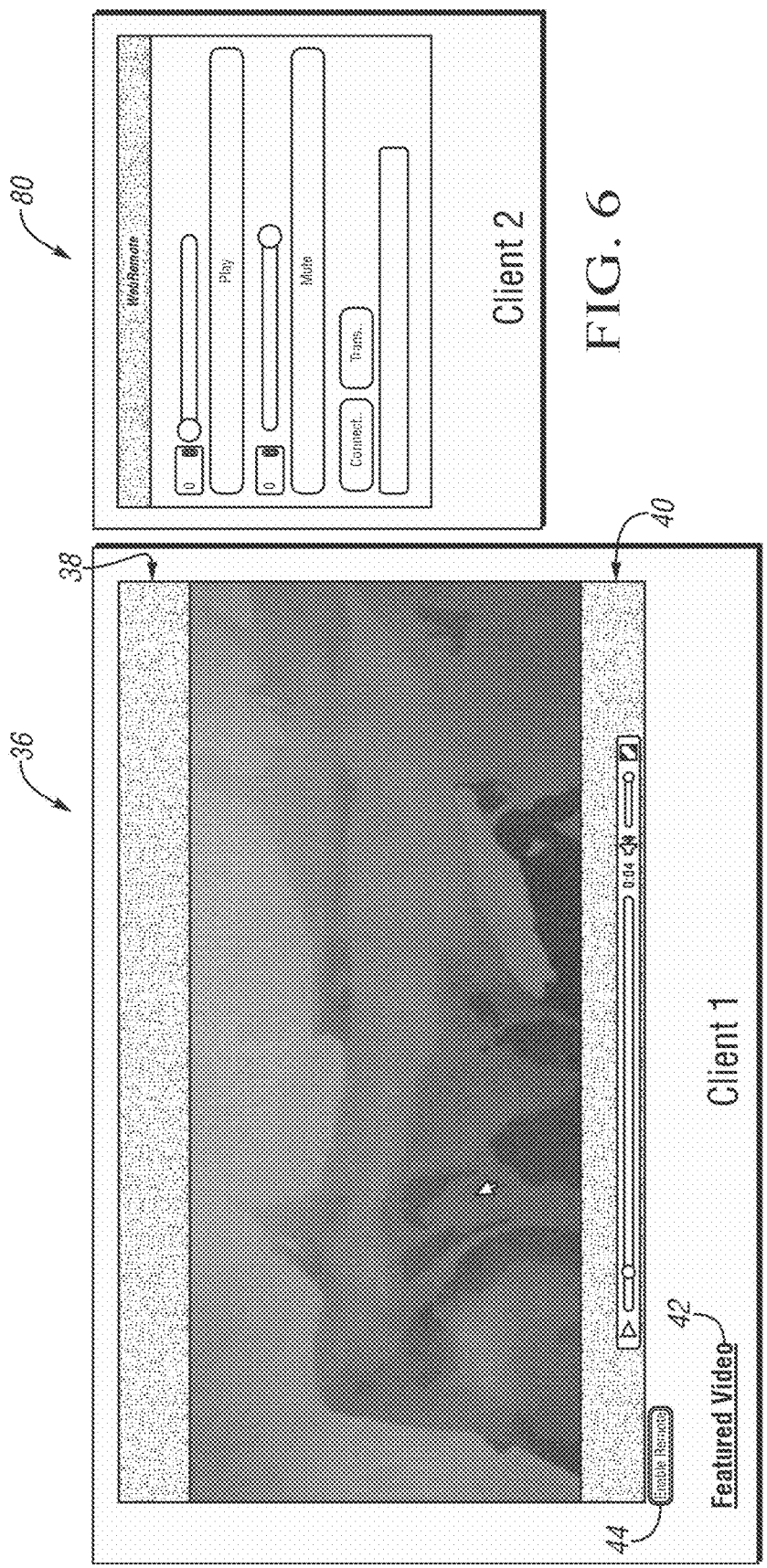

FIG. 11

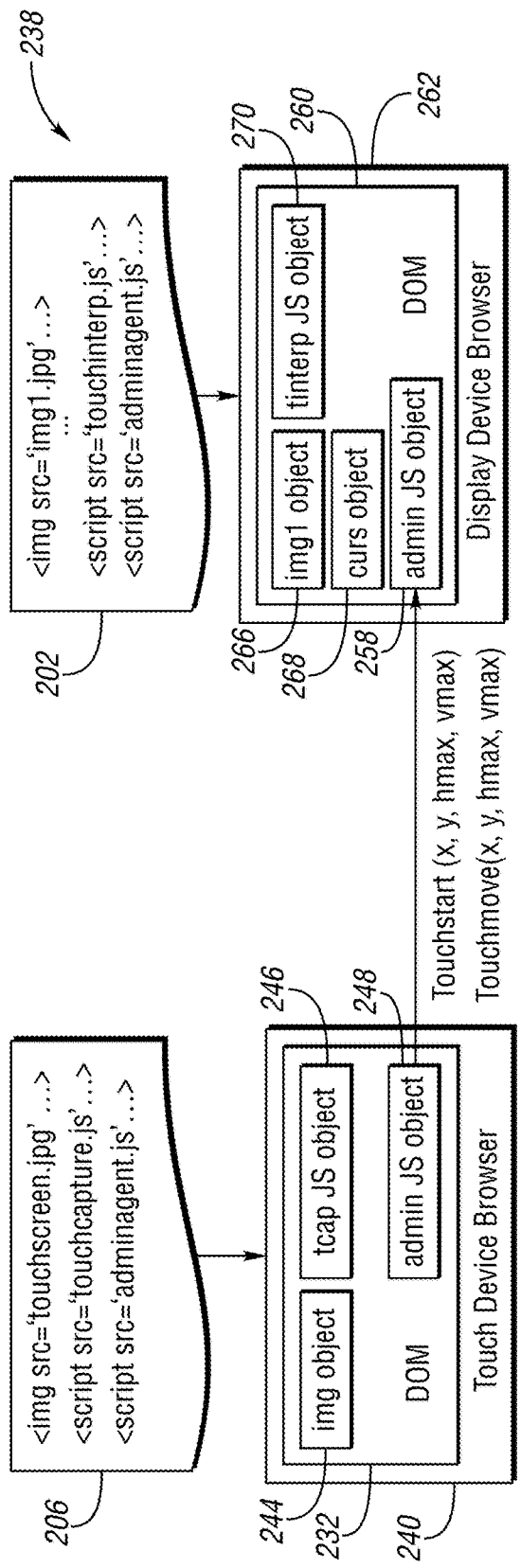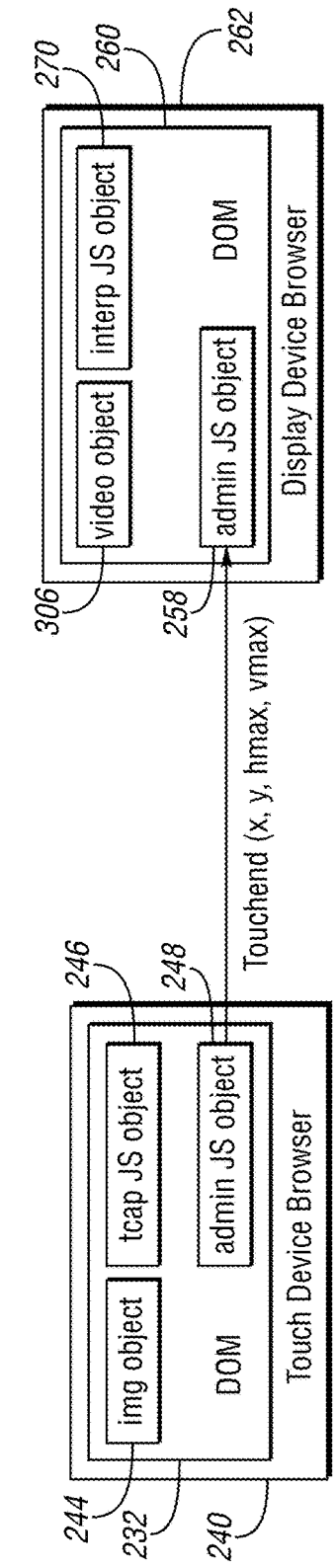
FIG. 22
FIG. 23

ADMINISTRATION OF WEB PAGE

CROSS-REFERENCE TO RELATED APPLICATIONS

This application is a continuation of U.S. application Ser. No. 13/922,386 filed Jun. 20, 2013, which in turn is a continuation-in-part of U.S. application Ser. No. 13/865,030 filed Apr. 17, 2013, which in turn is a continuation-in-part of U.S. application Ser. No. 13/721,356 filed Dec. 20, 2012, the disclosures and benefits of which are incorporated in their entireties by reference herein.

TECHNICAL FIELD

The present invention relates to Web pages, such as but not necessary limited to Web pages downloaded from a Web server or other entity for rendering with a Web browser or other application having capabilities sufficient to facilitate interfacing the Web page with a user.

BACKGROUND

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. FIG. 1 graphically represents a Document Object Model (DOM) as provided by the World Wide Web consortium, which can be found at http://www.w3.org/TR/DOM-Level-2-Core/introduction.html. (The figure and some of the related description provided hereinafter are subject to Copyright (c) Nov. 13, 2000, World Wide Web Consortium, (Massachusetts Institute of Technology, European Research Consortium for Informatics and Mathematics, Keio University). All Rights Reserved. http://www.w3.org/Consortium/Legal/2002/copyright-documents-200221231)

The DOM is a representation of a valid HTML and well-formed XHTML document. It defines the logical structure of documents and the way a document is accessed and manipulated. In the DOM specification, the term "document" is used in the broad sense—increasingly, XML is being used as a way of representing many different kinds of information that may be stored in diverse systems, and much of this would traditionally be seen as data rather than as documents. Nevertheless, XML presents this data as documents, and the DOM may be used to manage this data.

With the Document Object Model, programmers can build documents, navigate their structure, and add, modify, or delete elements and content. Anything found in an HTML or XHTML document can be accessed, changed, deleted, or added using the Document Object Model. As a W3C specification, one important objective for the Document Object Model is to provide a standard programming interface that can be used in a wide variety of environments and applications. The DOM is designed to be used with any programming language. The DOM is a programming API for documents. It is based on an object structure that closely resembles the structure of the documents it models. For instance, consider the table shown below, taken from an HTML document (Web page) and graphically represented in FIG. 1:

```
<TABLE>
<TBODY>
<TR>
<TD>Shady Grove</TD>
<TD>Aeolian</TD>
</TR>
<TR>
<TD>Over the River, Charlie</TD>
<TD>Dorian</TD>
</TR>
</TBODY>
</TABLE>
```

In the DOM, documents have a logical structure which is very much like a tree; to be more precise, which is like a "forest" or "grove", which can contain more than one tree. Each document contains zero or one doctype nodes, one root element node, and zero or more comments or processing instructions; the root element serves as the root of the element tree for the document. However, the DOM does not specify that documents must be implemented as a tree or a grove, nor does it specify how the relationships among objects be implemented. The DOM is a logical model that may be implemented in any convenient manner. In this specification, the term structure model is used to describe the tree-like representation of a document. The term "tree" is used when referring to the arrangement of those information items which can be reached by using "tree-walking" methods. One important property of DOM structure models is structural isomorphism: if any two Document Object Model implementations are used to create a representation of the same document, they will create the same structure model, in accordance with the XML Information Set. (Note: There may be some variations depending on the parser being used to build the DOM. For instance, the DOM may not contain whitespaces in element content if the parser discards them.)

The name "Document Object Model" was chosen because it is an "object model" in the traditional object oriented design sense: documents are modeled using objects, and the model encompasses not only the structure of a document, but also the behavior of a document and the objects of which it is composed. In other words, the nodes in the above diagram do not represent a data structure, they represent objects, which have functions and identity. As an object model, the DOM identifies: the interfaces and objects used to represent and manipulate a document; the semantics of these interfaces and objects—including both behavior and attributes; and the relationships and collaborations among these interfaces and objects.

The structure of Standard Generalized Markup Language (SGML) documents has traditionally been represented by an abstract data model, not by an object model. In an abstract data model, the model is centered around the data. In object oriented programming languages, the data itself is encapsulated in objects that hide the data. The functions associated with these objects determine how the objects may be manipulated, and they are part of the object model.

The Document Object Model is not a binary specification. DOM programs written in the same language binding will be source code compatible across platforms, but the DOM does not define any form of binary interoperability. The Document Object Model is not a way of persisting objects to XHTML or HTML. Instead of specifying how objects may be represented, the DOM specifies how XHTML and HTML documents are represented as objects, so that they may be used in object oriented programs. The Document Object Model is not a set of data structures; it is an object model that specifies interfaces. Although this document contains diagrams showing parent/child relationships, these are logical relationships defined by the programming interfaces, not representations of any particular internal data structures. The Document Object Model does not define what information in a document is relevant or how information in a document is structured. For XML, this is specified by the W3C XML Information Set. The DOM is simply an API to this information set.

The Document Object Model, despite its name, is not a competitor to the Component Object Model (COM). COM, like CORBA, is a language independent way to specify interfaces and objects; the DOM is a set of interfaces and objects designed for managing HTML and XML documents. The DOM may be implemented using language-independent systems like COM or CORBA; it may also be implemented using language-specific bindings like the Java or ECMAScript bindings specified in this document. The DOM originated as a specification to allow JavaScript scripts and Java programs to be portable among Web browsers. In the fundamental DOM interfaces, there are no objects representing entities. Numeric character references, and references to the pre-defined entities in HTML and XML, are replaced by the single character that makes up the entity's replacement.

The DOM specifies interfaces which may be used to manage XHTML or HTML documents. It is important to realize that these interfaces are an abstraction—much like "abstract base classes" in C++, they are a means of specifying a way to access and manipulate an application's internal representation of a document. Interfaces do not imply a particular concrete implementation. Each DOM application is free to maintain documents in any convenient representation, as long as the interfaces shown in this specification are supported. Some DOM implementations will be existing programs that use the DOM interfaces to access software written long before the DOM specification existed.

The proliferation of smartphones, tablets, laptops and televisions is creating the expectation and opportunity for a user experience to flow across these types of devices. At the same time, Web pages, such as but not necessarily limited to those using hyper transfer HyperText Markup Language (HTML) version 5 (HTML5) and related technologies, are increasingly viewed as an attractive means to deliver cloud based services to a wide range of network-connected devices for use of HTML and/or XML documents. HTML5 and Digital Living Network Alliance (DLNA) HTML5 remote user interface (RUI) are examples of various means contemplated by the present invention for multichannel video programming distributor (MVPDs), multiple system operators (MSOs) and other types of service providers to deliver their services through Web pages to a broad range of IP devices. In order for user experiences to flow across various types of IP devices, optionally when restrained to certain protocols/standards, a need exists for the devices and/or applications operable with the devices to enable multi-device use cases for various cloud-based services, such as but not necessarily limited to enabling multi-device use cases for remote control, discovery, collaboration and service migration.

BRIEF DESCRIPTION OF THE DRAWINGS

FIG. 4 illustrates a first visual representation of the Web page at the first client in accordance with one non-limiting aspect of the present invention.

FIG. 6 illustrates a control menu in accordance with one non-limiting aspect of the present invention.

FIG. 11 illustrates a home page in accordance with one non-limiting aspect of the present invention.

FIG. 22 illustrates DOM objects associated with touchscreen manipulation in accordance with one non-limiting aspect of the present invention.

FIG. 23 illustrates updating DOM objects associated with touchscreen manipulation in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
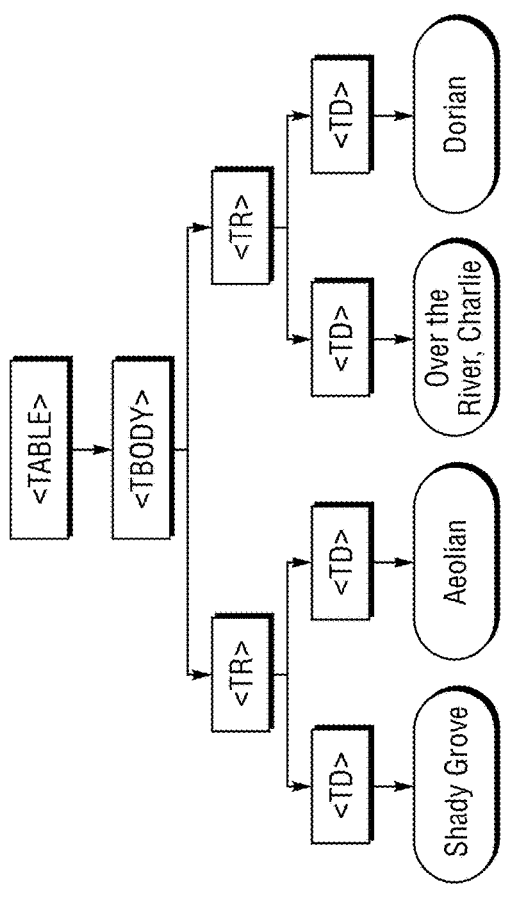
FIG. 1 graphically represents a Document Object Model (DOM).
Figure 2:
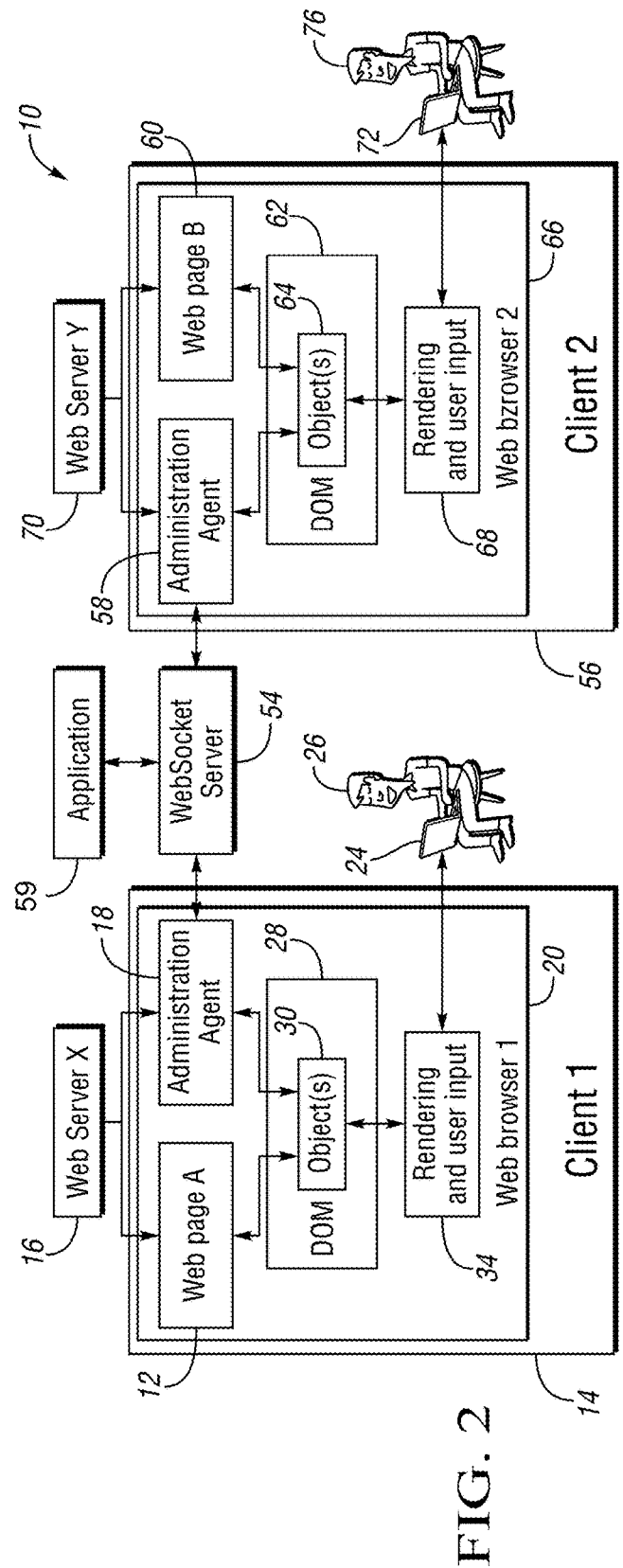
FIG. 2 illustrates a system configured to facilitate administrating Web pages in accordance with one non-limiting aspect of the present invention.

FIG. 2 illustrates a system 10 configured to facilitate administrating Web pages in accordance with one non-limiting aspect of the present invention. The contemplated Web page 12 may relate to any suitable document downloaded or otherwise transmitted to a first client 14 from a first Web server 16 or other remote entity. The Web pages may include applications, files, code, script, content, audio, video, software, etc. that combine to facilitate visual and/or non-visual representations of content associated with the corresponding Web page. The term "Web" is commonly used throughout the description of the present invention to reference any type of interaction between a server and a client over a network. To begin its presentation, the present invention is described with respect to administrating download of a Web page over the Internet as download of a Web page presents challenges particularly suitable to the administration contemplated by the present invention. This is done for exemplary non-limiting purposes and without necessarily intending to limit the scope and contemplation of the present invention. The present invention fully contemplates utilizing operations described below with respect to administrating a Web page for use in administrating other types of Web pages.

Administration of the Web page may be facilitated with an administration agent 18. The administration agent 18 may be configured to facilitate various operations contemplated by the present invention, including those associated with monitor, remote control, discovery, collaboration and service migration of the Web page 12. The client 14 may be a smartphone, tablet, laptop, set top box (STB), gateway, and/or television having a processor operable in cooperation with a memory or other logically executing feature to facilitate performing and/or directing the operations and issuing instructions associated with the administration agent. The administration agent 18 may be a script or other feature optionally embodied in a computer-readable medium having non-transitory instructions stored thereon that are sufficient for use with a processor or other instrument to facilitate the contemplated administration. The particular features of the client 14 and/or administration agent 18 may be varied according to the characteristics of the Web page(s) 12 being administered, which are for exemplary non-limiting purposes described with respect to those associated with facilitating visual representation of the Web page 12. These features may include a first Web browser 20 configured to facilitate rendering a related visual representation for output to a display 24 viewable by a first user 26.

The process of facilitating the visual representation of the Web page 12 may include the first Web browser 20 facilitating download of the first Web page 12 from the first Web server 16. The first Web browser 20 may create a document object model (DOM) 28, a model/view/controller or other analogous module based on the downloaded Web page 12. The DOM 28 may include a plurality of DOM objects 30 where some or all of the DOM objects 30 are created for rendering with the first Web browser 20 as part of processes associated with generating the visual representation of the Web page 12. One or more of the DOM objects 30 may include controllable attributes, e.g., attributes that are changeable between at least a first state and a second state. The current state of the controllable and non-controllable attributes may be used to dictate how the first Web browser 20 renders or otherwise presents at least part of the Web page 12 to the first user 26. For example, if the first Web browser 20 operates according to HTML5, the disclosure of which is hereby incorporated by reference in its entirety, the DOM 28 may be created according to the requirements of HTML5 and rendered by the first Web browser 20 according to a corresponding set of rules and/or regulations associated with HTML5 for translating the DOM objects 30. The protocol specific translation may define parameters related to facilitating the visual presentation of the Web page 12 and/or otherwise interfacing non-visual elements of the Web page 12.

Figure 3:
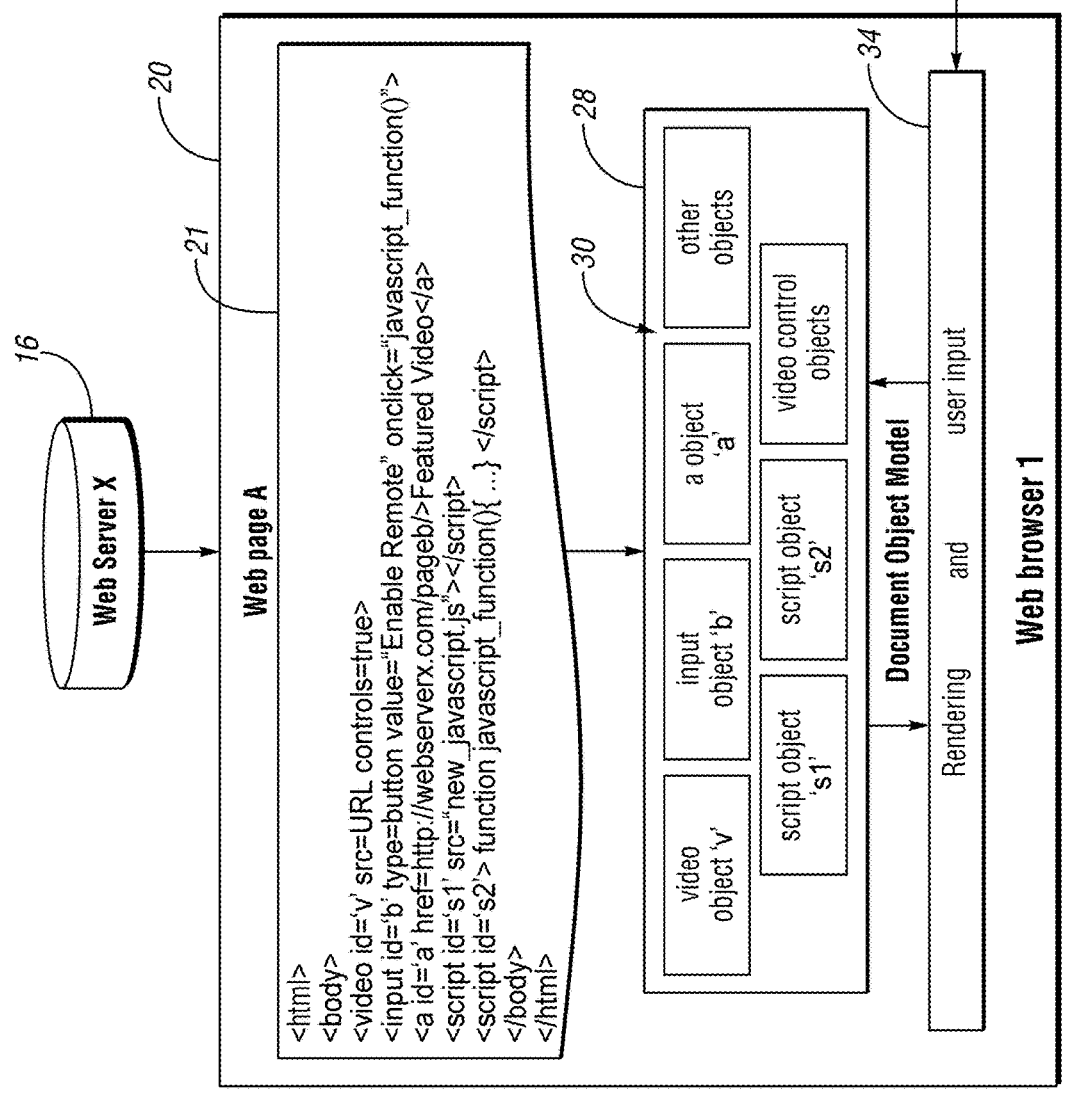
FIG. 3 schematically illustrates the first Web browser in accordance with one non-limiting aspect of the present invention.

FIG. 3 schematically illustrates the first Web browser 20 in accordance with one non-limiting aspect of the present invention. A partial view of the Web page 12 downloaded from the first Web server 16 is shown to illustrate a portion of the downloaded contents, e.g., the HTML code, scripts and other information associated with the Web page 12. The partial view is shown to be coded according to HTML but other codes and protocols may be used without deviating from the scope and contemplation of the present invention. The contents of the Web page 12 may be parsed or otherwise interpreted with the first Web browser 20 to generate the DOM 28 and the DOM objects 30 and to set states for the controllable attributes. An exemplary number of DOM objects are illustrated to correspond with a video object, an input object, a first script object, a second script object, a video control objects, a generic object and other objects. A human computer interface (HCI) 34 may be configured to control presentation of the Web page 12 to the first user 26 as a function of the states associated with the DOM objects 30. The first Web browser 20 may be configured to register or otherwise detect when one or more of the DOM objects 30 or corresponding attributes are adjusted and to implement a corresponding adjustment to the Web page presentation. Web pages 12 may be configured to support a virtually limit limitless number of controllable features, scripts, attributes, etc. that may require an association with a related DOM object 30.

FIG. 4 illustrates a first visual representation 36 of the Web page 12 at the first client 14 in accordance with one non-limiting aspect of the present invention. The first visual representation 36 may be generated by the first Web browser 20 for output to the display 24 according to an initial interpretation of the downloaded Web page 12. The first visual representation 36 is shown to include a video window 38, a video control menu 40, a featured video link 42, and an enable remote button 44. The video window 38 relates to the video object, the video control menu 40 relates to the video control object, the featured video link 42 relates to the generic object, and the enable remote button 44 relates to the input object. Following the initial presentation of the Web page 12, the Web page 12 may be manipulated, amongst other things, according to user interactions with the visually represented DOM objects, such as through HCI-based manipulation of one of the video control menu 40, the featured link 42 and the enable remote button 44, and/or through engagement of one of the non-visually represented DOM objects, such as one of the first script object and the second script object. The first and second script objects may be engaged based on manipulation of one of the visually represented DOM objects 30 and/or as a function of other triggering events, which may be prompted following virtually any type of measurable or detectable event.

The first visual representation 36 corresponds with the first Web browser 20 interpreting the downloaded Web page and acting according to an interpretation of the DOM objects 30. The DOM objects 30 may be relatively static at least in that, other than their attributes potentially changing, the number of DOM objects 30 occupying the DOM 28 may remain constant after initial DOM construction and until the Web page 12 is re-downloaded (DOM construction may occur anew at each download and/or some portions may be reused). The subsequent manipulation of DOM objects 30 can result in changes in the presentation associated with the first visual representation, optionally without requiring additional communications with the Web server 16 to re-construct the DOM 28 and/or to otherwise vary DOM objects/attributes. In some cases, such as with video streaming, continuous contact or sessions may be maintained with the first Web server 16 (or a video server) but this communication may not necessarily result in changes to the DOM objects 30 and/or generation of a new DOM 28. Changes to the first visual representation 36 may be considered to be implemented independently of the first Web server 16 when the corresponding presentation is altered without requiring the first Web server 16 to specify attributes or otherwise make adjustments to the DOM objects 30. While the present invention contemplates facilitating DOM objects 30 changes independently of the first Web server 16, it may be advantageous in some cases for the first Web server 16 to transmit commands or otherwise instructed alterations to one or more of the DOM objects 30 or the corresponding attributes.

DOM changes may be implemented through the HCI 34 according to user interaction with the first Web browser 20. With respect to the video controls object, the HCI 34 may register user actuation of a play button to instigate playback of the video object that then changes a state of the video object to begin play of the video to the user as part of a second visual representation (not shown). The second visual representation may correspond with presentation of the Web page 12 after the first Web browser 20 identifies a change in one of the visually dependent DOM objects 30, e.g. the video object changing from a pause state to a play state. Each change in one or more of the DOM objects 30 having a resulting influence on the visual presentation may be considered as a new visual representation of the Web page 12. The first Web browser 20 may be configured to automatically detect changes in the DOM objects 30 and/or scripts associated with the first Web browser 20 or downloaded in conjunction with the Web page 12 may also be used to facilitate detecting and/or implementing changes related to the DOM objects 30. Once a change is detected, similar processes, scripts, etc. may be used by the first Web browser 20, or other features associated with the first client 14, to facilitate implementing a corresponding change in the presentation of the Web page 12, optionally with some of the changes being hidden or otherwise non-visual to the user. (Web pages are extremely diverse such that any number of operations may be desired in addition to those that are visible or apparent to a user.)

Figure 5:
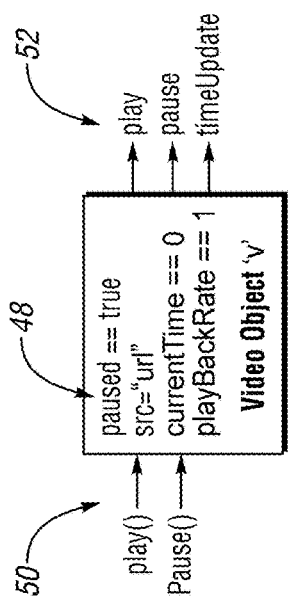
FIG. 5 schematically illustrates the video object in accordance with one non-limiting aspect of the present invention.

FIG. 5 schematically illustrates the video object in accordance with one non-limiting aspect of the present invention. The video object is shown to include a set of attributes 48 that reflect its internal states; optionally some of these attributes can be set by the first Web browser 20, the Web page 12 and/or JavaScript (or other type of script). The video object may include a set of functions 50 that can be called by JavaScript to change the object's state, i.e., to change an attribute from one of an available state to another available state. The video object may also include a set of events 52 that can be monitored by JavaScript as the object's internal state changes. FIG. 4 shows the video object being associated with an exemplary subset of play and/or pause functions 50 (arrows into the object); paused, source, current time and playback rate attributes 48 (name=value inside the object); and play, pause and time update events 52 (arrows out of the object). As an example, if the user clicks the mouse on the "play" video control in FIG. 3, the play( ) function of the video object will be called. The paused attribute will be set to false. The change of the value of the paused attribute will cause the play event to occur.

If the administration agent 18 registers to receive the play event, that function will learn when the video transitions from paused to playing, independent of what caused that transition. The administration agent 18 could set the currentTime attribute to the number of seconds corresponding to the middle of the video, which would cause the video playback to jump to that time. It would also cause a timeUpdate event to occur. It can be seen from the example that a administration agent 18 may be configured to manipulate an arbitrary DOM object 30 in the same way as a user causes that to happen. The administration agent 18 can also learn of user (or other JavaScript function) interaction with the DOM 28. A point to note is that the set of DOM objects 30 corresponding to a Web page 12 may be created each time a new HTML page is loaded by the browser. Object interactions as described in the above example occur with the set of objects associated with the Web page 12. If the user clicked on the "Featured Video" link in FIG. 3, a new Web page would be loaded and the set of objects created for the previous page would be destroyed and a new set of objects would be created for that new page. It is possible for administration agent 18 on the Web page 12 to save arbitrary DOM object state across page reloads by storing that state information as a "cookie" or a local file. In browsers that support multiple browser windows via tabs or other mechanisms, each window may be considered as an independent entity having its own DOM.

The administration agent 18 contemplated by the present invention may include the JavaScript used to manipulate the DOM objects 30 and/or it may operate in cooperation with other such JavaScripts (Web browser may employ multiple JavaScripts, etc.). The administration agent 18 may be configured to receive instructions from other sources besides the HCI 34 and or the Web server 20 in order to facilitate changing or otherwise manipulating the DOM objects 30. The administration agent 18 may be an application or other instrument capable of receiving control messages from other entities desiring to control or manipulate the DOM objects 30 in order to facilitate a corresponding change in the presentation or operation of the Web page 12 as rendered by the first Web browser 20. The administration agent 18 and/or the first client 14 may include a bridge computer interface (BCI) to facilitate interfacing control messages and other messages over a bridge 54 between the first client 14 and a second client 56. The bridge 54 may be a Web socket, tunnel, XMLHttpRequest (XHR) architecture or other bi-directional communication medium sufficient to facilitate signaling exchange between the first client and the second client.

The bridge 54 may be associated with an application 59 configured to support maintenance of the session/communication range between the first and second clients 14, 56 and/or the application 59 may be associated with monitoring activity conducted through the bridge 54, e.g., to monitoring current state of a DOM 28 of the first client 14 and/or the second client 56. Amongst other potential capabilities, the bridge application 59 may be configured to: facilitate pairing of the controlling and controlled Web pages, e.g., by explicitly using 'id' or pre-configuration or implicitly by detected physical proximity or presence on the same local area network; facilitate control of the number of agents that may be interconnected; provide rules for interaction among agents, e.g. one-at-a-time, all-at-once; and provide rules for terminating the interconnectivity of the agents.

The second client 56 may be configured in a similar manner to the first client 14. The second client 56 is shown to also include its own version of a administration agent 58, a Web page 60, a DOM 62, DOM objects 64, Web browser 66, and HCI 68. (Hereafter, these elements when application to the first client are noted as "first" and as "second" when applicable to the second client). The second client 56 may operate similarly to the first client 14 at least with respect to being configured to facilitate download of the second Web page 60 from a second Web server 70 whereupon the second Web browser 66 operates similarly to create the local second DOM 62, second DOM objects 64 and/or second attributes for use in rendering a corresponding visual representation on a display 72 for a second user 76. The second DOM 62 may operate similarly to the first DOM 28 in that changes to the second DOM objects 64 and/or second attributes may result in corresponding visual and non-visual alterations to the visual representation of the Web page 60 at the second client 56. One non-limiting aspect of the present invention contemplates allowing the second client 56 to facilitate manipulation of the first DOM 28 in order to facilitate remote control, discovery, collaboration and service migration. In particular, the second administration agent 58 may be configured to facilitate communication of control messages with the first administration agent 16 in order to instruct manipulation of the first DOM 28.

The first administration agent 18 may be configured to publish a copy of the first DOM 28 currently active at the first client 14 to the second administration agent 58. The copy may represent each or a subset of first DOM objects 30 and corresponding first attributes as occurring at creation of the copy. The second administration agent 58 may cooperate with the second Web browser 66 to facilitate a visual representation of the copy. The visual representation of the copy may be useful in displaying controllable features to the second user 76. (In some cases, the second user 76 and the first user 26 may be the same person if the person is operating both of the first and second clients 14, 56, e.g., when the first client 14 is a television and second client 56 is a tablet or mobile device.) One of the first and second administration agents 18, 58 may be configured to identify suitable DOM objects 30 to be included in the copy or to be displayed to the second user 76 as being features that may be controllable. The visual representation of the copy may be used to display the controllable attributes of the first DOM 28 through the second client 56 in order to notify the second user 76 of one or more first DOM objects 30 that may be available for control. The second administration agent 58 may determine user manipulation of the first DOM objects 30 noted in the copy according to interaction of the second user 76 with the second HCI 68. When one of the first DOM objects 30 in the copy is altered through the second HCI 68 or a script or other element operating at the second client 56, the second administration agent 58 may send a corresponding control message to the first administration agent 18.

FIG. 6 illustrates a control menu 80 in accordance with one non-limiting aspect of the present invention. The control menu 80 may be presented through the second Web browser 66 to facilitate generating the control messages necessary to facilitate manipulating the first DOM 28. The control menu 80 may display a plurality of selectable buttons, menus or other features related to the first DOM objects 30 included within the copy. A control menu message may be provided from the first device 14 to specify the first DOM objects 30 and/or the first DOM objects 30 that are controllable through the control menu 80. The second Web browser 66 and/or the second administration agent 58 may be configured to determine user interaction with the control menu 80 and to generate corresponding control messages. The control messages may then be sent through a BCI associated with the second administration agent 58 for transmission over the bridge 54 and receipt at the first administration agent 18. The first administration agent 18 may be configured to process received control messages and to implement a corresponding adjustment to the first DOM 28, thereby resulting in a corresponding manipulation of the first Web page 12 being provided through the first client 14. This capability allows a user of the second client 76 to manipulate presentation of the first Web page 12 at the first client 14 without having to request the first Web server 16 to direct the manipulative presentation, i.e., without requiring the first Web server 16 to transmit messages or otherwise control the first Web browser 20 to make adjustments to one or more of the first DOM objects 30.

The control menu 80 presented at the second client 56, formatted as the Web page 60, is shown to include exemplary controls and is not necessary intended to limit the scope and contemplation of the present invention. In particular, the present invention contemplates generating any type of control menu or graphical user interface (GUI) sufficient to convey which one or more of the DOM objects 30 included in the copy are available for manipulation. Optionally, the application 59 associated with the bridge 54 may be configured to control the options made available at the second client 56, such as according to subscription services, quality of service (QOS) or other right/entitlements of a user identified to be operating the second client. In addition to facilitating remote control of the first DOM 28 from the second client 56, the capabilities of the present invention may also be useful in temporarily or permanently migrating services provided through the first client 14 to the second client 56. The migration may correspond with allowing access to the services currently being accessed or otherwise permitted for access through this first client 14 at the second client 56, e.g., to allow viewing of the video showing at the first client 14 through the second client 56.

Figure 7:
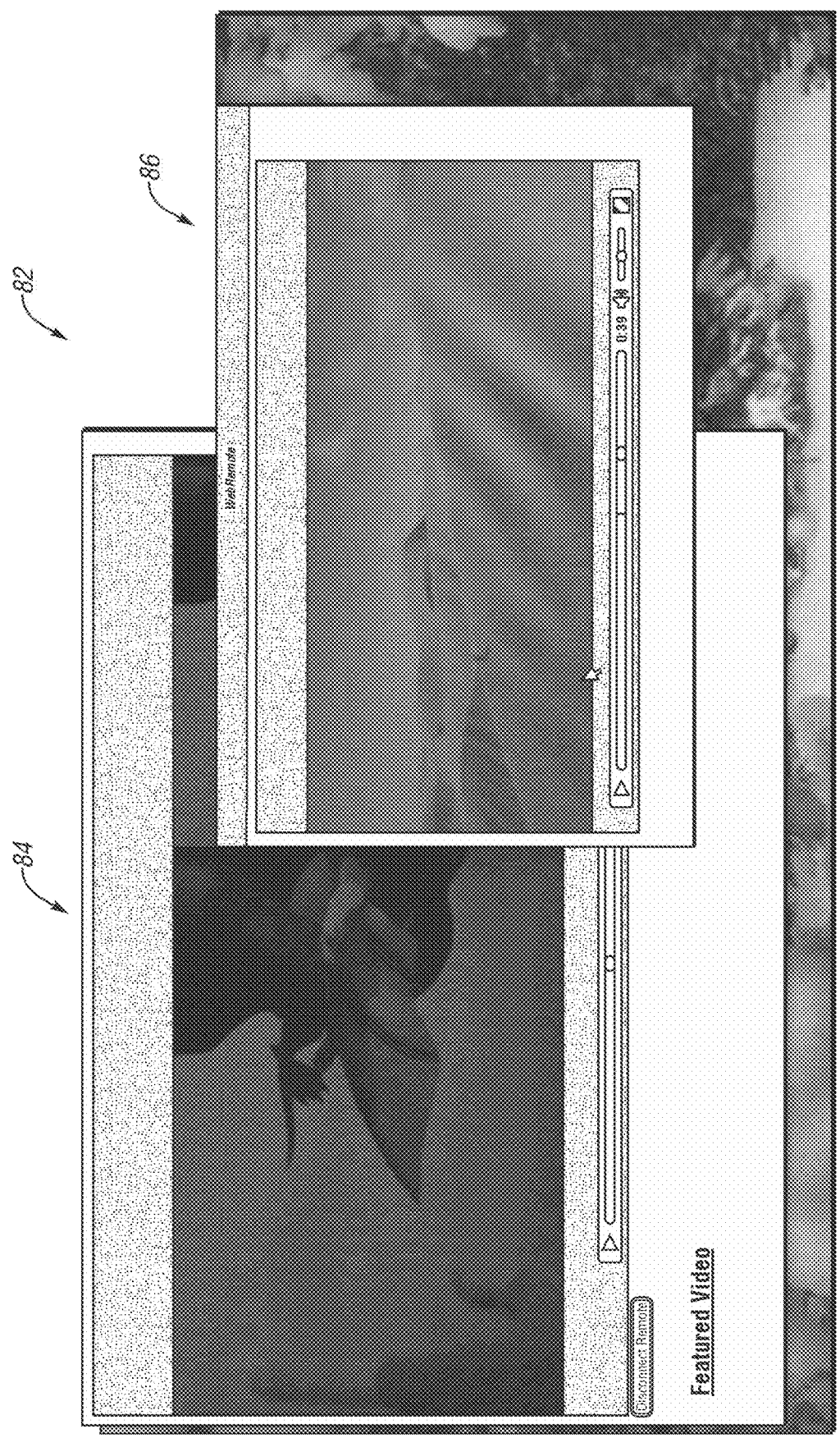
FIG. 7 illustrates a migration in accordance with one non-limiting aspect of the present invention.

FIG. 7 illustrates a migration 82 in accordance with one non-limiting aspect of the present invention. A first client visual representation 84 of a video is shown relative to a second client visual representation 86. The first client visual representation 84 may correspond with the video as played at the first client 14 using the first Web browser 20 and the second client visual representation 86 may correspond with the same video as being played through the second Web browser 66 of the second client 56. The first client visual representation 84 is shown to be paused while the second client visual representation 86 is shown to be actively playing the video. The video may be paused at the first client 14 through control messages originating at the second client 56, e.g., in response to the second user selecting a pause command through the control menu (see FIG. 5). Thereafter, the second client 56 may register user interaction with a transfer button included within the control menu. User selection of a transfer button may trigger the second administration agent 58 to communicate a corresponding control message to the first administration agent 18 that prompts the first administration agent 18 to adjust the first DOM 28 in order to facilitate further playback of the video at the second client 56, e.g., the video may be paused at the first client 14 and thereafter played through the second client 56. The video may be transferred through the bridge 54 and/or the second client 56 may contact the source of the video to facilitate further viewing.

Figure 8:
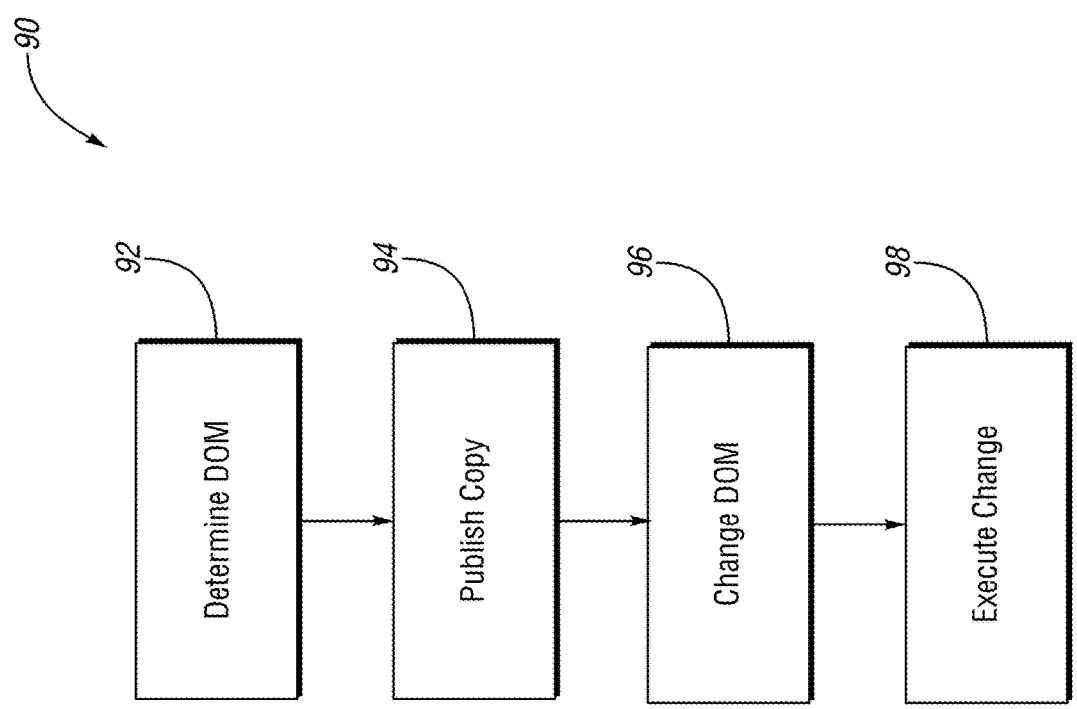
FIG. 8 illustrates a flowchart of a Web page control method in accordance with one non-limiting aspect of the present invention.

FIG. 8 illustrates a flowchart 90 of a Web page control method in accordance with one non-limiting aspect of the present invention. The method may be embodied in a computer-readable medium associated with one of the above-described clients, applications, Web servers, etc. The method is described with respect to facilitating control of a Web page visually rendered or otherwise utilized at a first client according to interactions occurring at a second client for exemplary non-limiting purposes. The present invention fully contemplates facilitating similar operations for Web pages in response to events other than those occurring at the second client. The method is described with respect to facilitating control of the Web page at the first client independently of a Web server from which the Web page was downloaded to the first client in order to demonstrate one advantageous aspect of the present invention with respect to facilitating control of Web pages without requiring Web servers and/or Web browsers to be modified or independently programmed to support the desired control.

Block 92 relates to determining a DOM at the first client or other device for which monitor and/or control is desired. The DOM as described in HTML is rather prevalent in the use of Web pages, however, the present invention is not necessary limited to facilitating monitor and/or control that is dependent on DOM as other types or configurations of modules similar to the DOM may be used. Block 94 relates to publishing a copy of the DOM to the second client or other device through which control of the first device is desired. The copy may include the DOM objects and/or attributes of the identified DOM as occurring at a time of generating the copy. The copy may be published by transmitting a message through a bridge or other medium connecting the first client with the second client, and optionally without relying on the Web server to communicate the copy. Block 96 relates to determining a desire to change one of the DOM objects included in the copy, such as through user interaction with a second Web page, second Web browser or other feature available at the second client. Block 98 relates to executing the change at the first client by transmitting a control message or other suitable signal to the first client representative of the change registered at the second client. Thereafter, the administration agent or other element operating at the first client may implement the DOM change in a manner that results in the corresponding Web browser performing a corresponding operation associated with the desired change.

Figure 9:
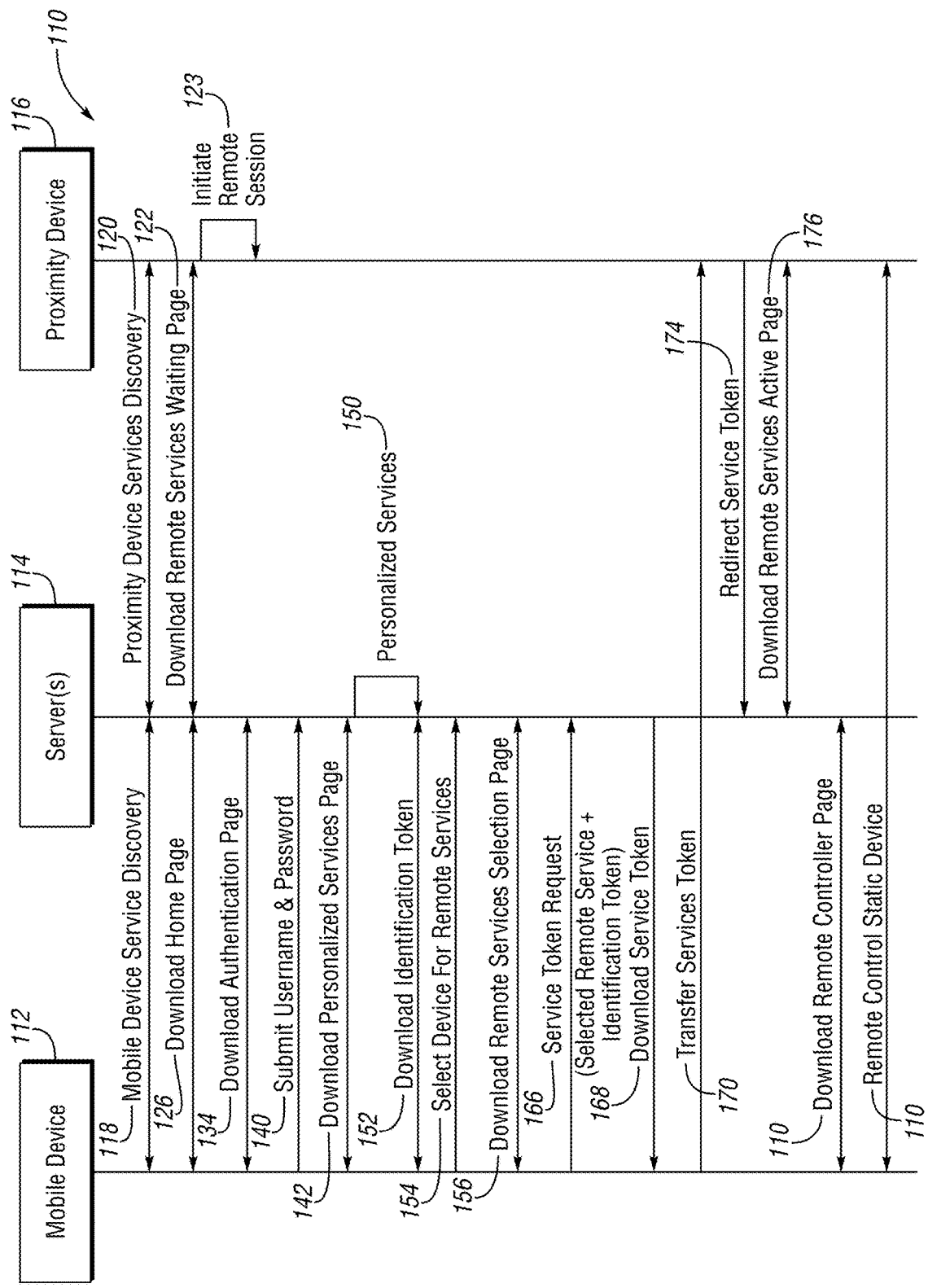
FIG. 9 illustrates a messaging diagram for personalizing and/or projecting services delivered through webpages in accordance with one non-limiting aspect of the present invention.

FIG. 9 illustrates a messaging diagram 110 for personalizing and/or projecting services delivered through webpages in accordance with one non-limiting aspect of the present invention. The messaging diagram 110 is illustrated with respect to messaging, communications, webpages and other informational exchanges occurring between a mobile device 112, a server 114 or servers and a proximity device 116. The messaging diagram 110 demonstrates one non-limiting aspect of the present invention where services personalized for access through or otherwise made available to the mobile device 112 may be made available for projection, transfer or other access through the proximity device 116. The mobile device 112 may correspond with the second device 56 described above, and optionally may include the components and capabilities associated therewith, e.g., the mobile device 112 may be a smartphone, tablet, etc. The proximity device 116 may be one of one or more devices in proximity to or otherwise associated with the mobile device 112 and may correspond with the first client 14 described above, and optionally may include the components and capabilities associated therewith, e.g., the proximity device 116 may be a television, a STB, a computer, etc. The server 114 may correspond with one or more servers configured to facilitate sourcing webpages, sourcing content, performing authentications/verifications, issuing tokens and performing other operations similar to those described above and/or necessary to facilitate the operations described below. Optionally, the server 114 may correspond with and/or include capabilities related to the above described Web server 16, Web server 70 and/or WebSocket server 54.

A mobile device service discovery process 118 may occur between the mobile device 112 and the server 114. The mobile device service discovery process 118 may correspond with signaling exchanged between the mobile device 112 and the server 114 in order to determine presence of the mobile device 112 within a particular area serviced by the server 114, such as in the manner described in U.S. patent application Ser. No. 13/792,089, the disclosure of which is hereby Incorporated by reference in its entirety. The presence detection, for example, may be used to determine connection of the mobile device 112 to a gateway associated with a home network of a subscriber and/or connection of the mobile device 112 to a cellular tower. Information may be exchanged between the mobile device 112 and the server 114 to establish capabilities, entitlements, rights, operational limitations and/or other information associated with determining services to be made available to the mobile device 112. The exchange information may include advertising identifying information for the device 112 (or multiple devices) and/or the applications capable or desired for use through remote session, such as names sufficient to uniquely identifying each device and/or application. The messaging diagram 110 is predominately described with respect to facilitating television related services, such as access to television channels, programs and movies through wireless and/or wired signaling, including capabilities to facilitate television guide related applications, video-on-demand (VOD) and other television related services. This is done for exemplary non-limiting purposes as present invention fully contemplates its use and application in facilitating personalization projection of other types of services and content and is not necessary intended be limited to television related services.

A complimentary proximity device service advertising process 120 may occur between the proximity device and the server. The proximity device service advertising process 120 may correspond with signaling exchange between the proximity device 116, which hereinafter after is referred to for exemplary non-limiting purposes as being a television, and the server 114 in order to advertise presence of the television 116 within a particular area serviced by the server 114 and/or defined relative to the presence or other locational information associated with the mobile device 112. The proximity device advertising process 120 may include advertise identifying information for the devices and/or the applications capable or desired for use through remote session, such as names sufficient to uniquely identifying each device and/or application. Optionally, the proximity device service advertising process 120 may include advertising presence of multiple proximity devices (multiple televisions) and/or multiple devices capable of being projected services associated with the mobile device 112 and/or otherwise initiated with reliance on interactions performed through the mobile device 112. One non-limiting aspect of the present invention contemplates the mobile device 112 acting as a second screen application for the illustrated television 116 such that the television(s) 116 is determined to be within proximity to the mobile device 112 may be those within a room associated with the mobile device 112 and/or within a viewing distance of the mobile device 112, i.e., to allow a user to view the mobile device 112 while also viewing the television.

Figure 10:
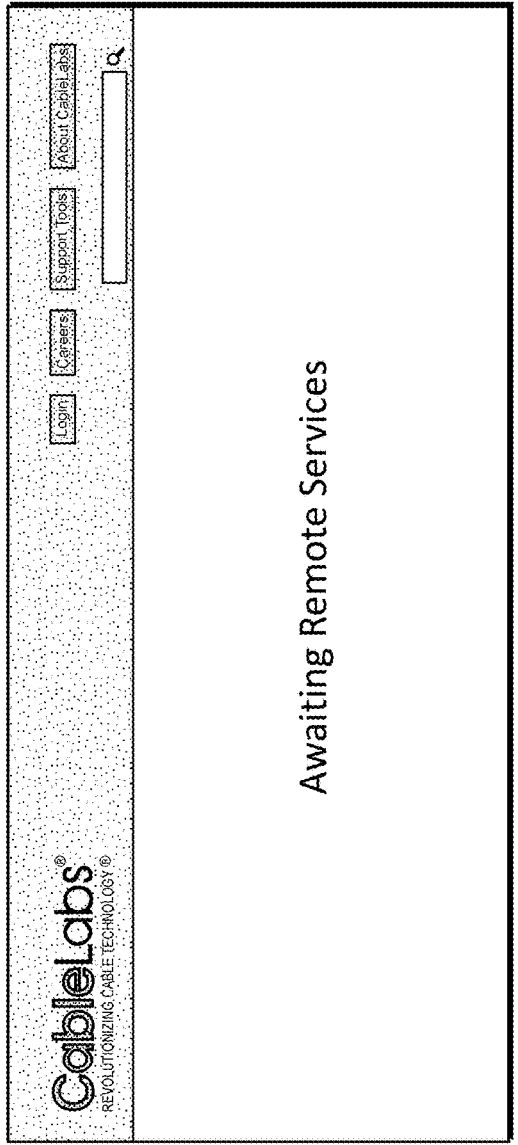
FIG. 10 illustrates a remote services waiting webpage in accordance with one non-limiting aspect of the present invention.

In the event the user desires to initiate a remote session or otherwise prepare the proximity device 116 to accept services projected from the mobile device 112, a television browser associated with the television 116 may be instructed by the user and/or signals received from the mobile device 112 to download 122 a remote services waiting webpage 124 from the server 114. FIG. 10 illustrates the remote services waiting webpage 124 in accordance with one non-limiting aspect of the present invention. The remote services waiting webpage 124 may be displayed on the television 116 to convey to the user that the television browser is active and awaiting further instructions, i.e., that a suitable DOM has been created and that the DOM may be controlled in the manner described above to facilitate further operations, such as by the mobile device 112 and/or an suitable administrative agent operating on the mobile device 112 and/or the television 116. The preparation of the television 116 to receive a remote session 123 via webpages is described for exemplary non-limiting purposes as the present invention particularly contemplates its use and application in facilitating access to services delivered through HTML 5, such as the manner described above, in order to facilitate access to services, content, television and other media through generic or standard mechanisms or non-proprietary mechanisms. While the multiple webpages are described, the present invention is not necessary limited to simply downloading such multiple pages and fully contemplates similar information being conveyed through a single webpage. The use of the described webpages may provide greater appeal than services delivered through service provider constrained or proprietary mechanisms, e.g., satellite and/or television signaling requiring scrambling with a STB or other similar type of device.

Figure 11:
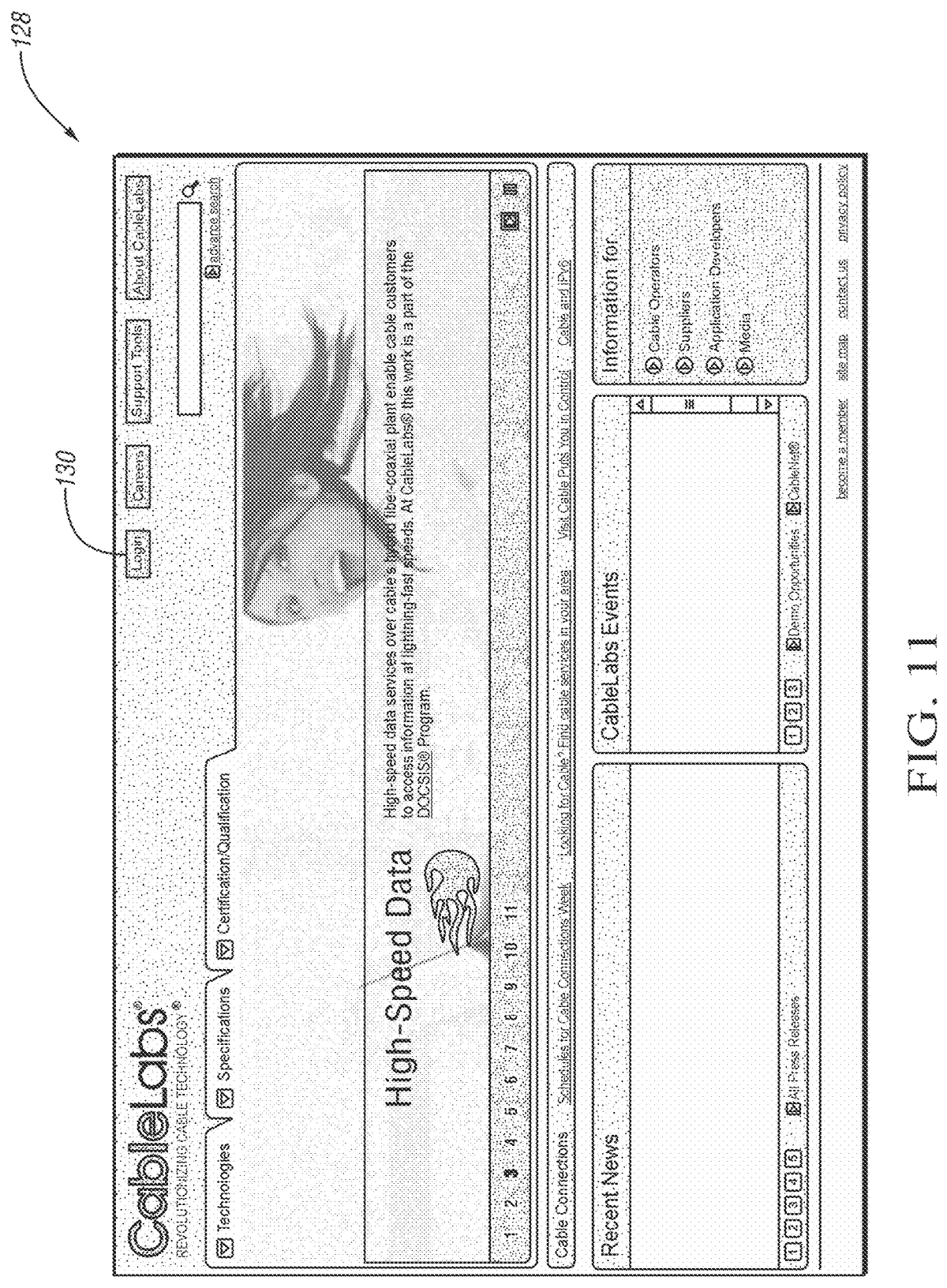

A download 126 of a home webpage 128 may occur at the mobile device 112 in response to user interaction with a mobile browser operating on the mobile device 112, e.g., in response to the user selecting a button or enabling application operating on the mobile device 112 to access the Internet or otherwise facilitate web browsing. FIG. 11 illustrates the home webpage 128 in accordance with one non-limiting aspect of the present invention. The mobile browser may generate a suitable DOM to facilitate rendering the home webpage 128 on the mobile device 112. The home webpage 128 may correspond with a default page, portal or other interface associated with a service provider currently providing services to the mobile device 112 and/or otherwise associated with engagement of the mobile browser. The home webpage 128 may be generic insofar as providing information or listing available services available to members or subscribers of the service provider such that the user must be identified or otherwise authenticated prior to the home webpage 128 being personalized and/or conveying personal information. A login button 130 may be included to facilitate inputting user information necessary to authenticate the user and initiate personalization.

Figure 12:
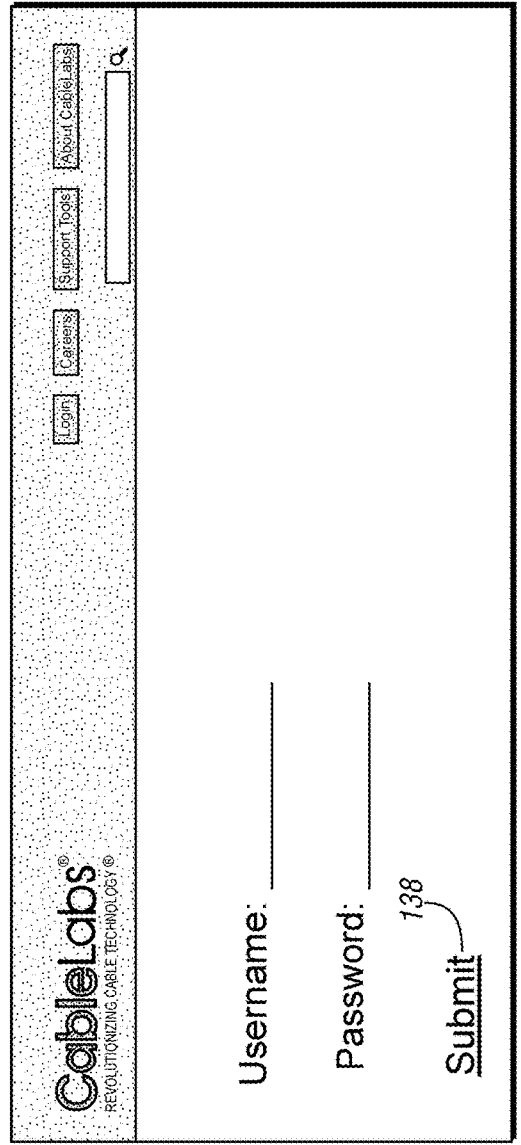
FIG. 12 illustrates an authentication webpage in accordance with one non-limiting aspect of the present invention.

A download 134 of an authentication webpage 136 may occur in response to user selection of the login button 130. FIG. 12 illustrates the authentication webpage 136 in accordance with one non-limiting aspect of the present invention. The authentication webpage 136 may be downloaded in order to facilitate input of a username and a password. A submit button 138 may be actuated once the username and password are entered in order to provide a username-password message 140 to the server 114 for authentication. The server 114 may include a database or other relational information sufficient to facilitate identifying whether the username and password corresponds with an authorized subscriber. If an authorized subscriber is determined, the corresponding privileges, entitlements, rights and other service accessing related parameters may be determined in order to adjudicate services accessible to the user. Optionally, the operational limitations of the mobile device 112 may be assessed to determine the services made available to the mobile device 112 and/or the services noted to the mobile device 112 being available for projection to the television 116. The user may be entitled to access certain services beyond those that are suitable for access through the mobile device 112. Certain services may also be designated for remote session operation, i.e., projection to the television 116, such as those entitled to the user but incapable of being provided through the mobile device 112.

Figure 13:
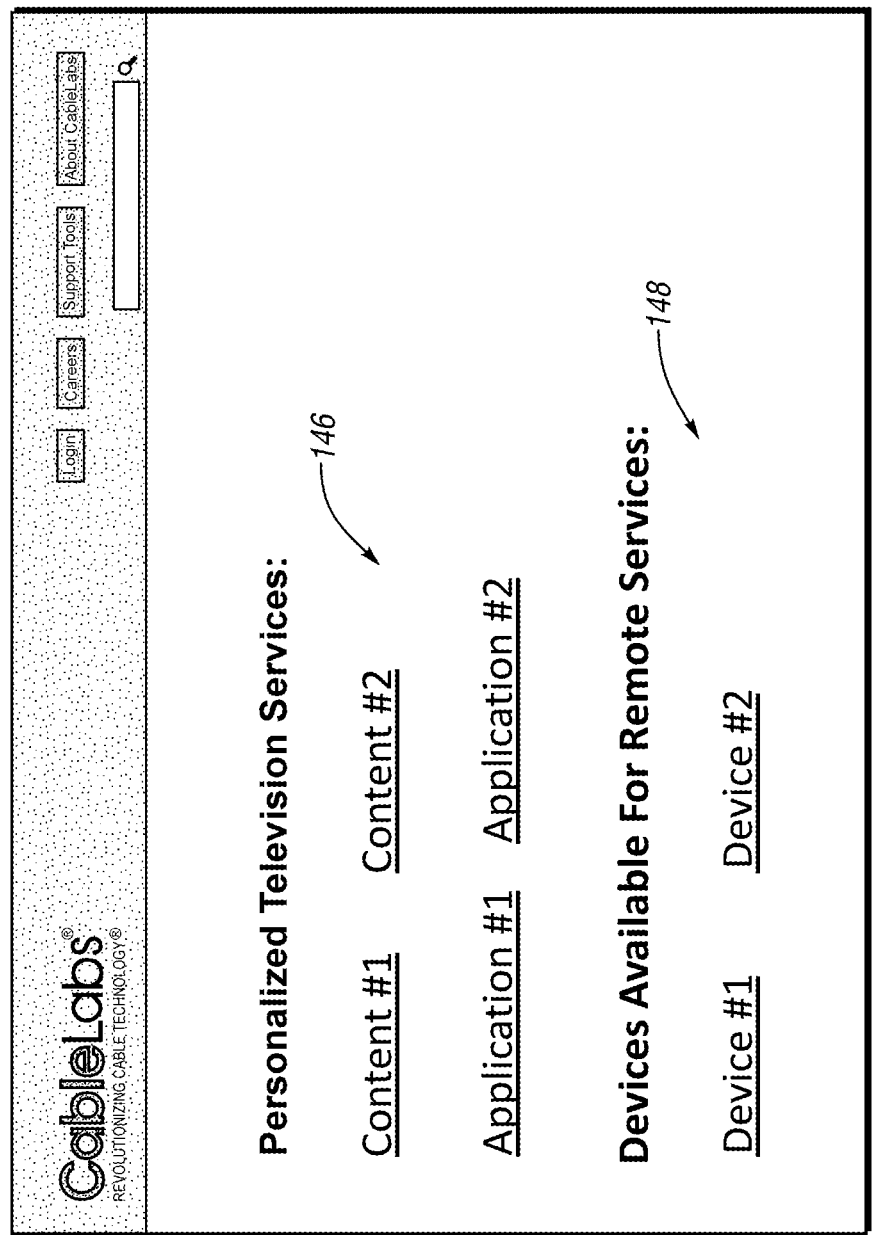
FIG. 13 illustrates a personalized services webpage in accordance with one non-limiting aspect of the present invention.

A download 142 of a personalized services webpage 144 may occur in response to successful authentication of the user. FIG. 13 illustrates the personalized services webpage 144 in accordance with one non-limiting aspect of the present invention. The personalized services webpage 144 may be generated as part of a personalized services process executing at the server 114 to identify services to be made available to the mobile device 112. The personalized services webpage 144 is shown to include a personalized television services portion 146 and a devices available for remote services portion 148. The personalized services webpage 144 may be generated as a function of a personalized services process 150 executed at the server 114. The personalized television services portion 146 may be used to identify a plurality of television services available through the mobile device 112 in response to selection of a corresponding link. The television services determined to be made available to the mobile device 112 may correspond with those identified according to the operational limitations, privileges and other information associated with the received username and password. The devices available for remote services portion 148 may be used to identify a plurality of devices through which one or more of the plurality of television services identified in the personalized television services portion 146 and/or other non-illustrated television services may be projected. The devices available for remote session services portion 148 indicates a first device (e.g. television 116) and a second device as being available for service projections, which may occur in the event the mobile device 112 is within a viewing distance of multiple televisions and/or devices capable of being projected television services.

In concert with or prior to download of the personalized services webpage 144, the server 114 may generate an identification token for the user. A download 152 of the identification token may occur in order to provide the mobile browser a copy of the identification token. The identification token may form a credential or other security related information regarding confirmed identity of the username and password. The identification token may include addressing information, entitlements, time of life and other information that may be reviewed for subsequent authentications of the mobile device 112 or other device receiving the identification token from the mobile device 112. The identification token, for example, may be required in order for the mobile device 112 to access one of the television services listed within the personalized services webpage 144, i.e., the identification token may be provided and/or required in order to grant access to the corresponding link or website associated with a selected one of the television services 146. In the event the user selects one of the remote services links 148, a remote service selection message 154 may be communicated to the server 114 to indicate the one or more devices selected for remote services. For exemplary non-limiting purposes, the present invention illustrates the user selecting a single device for remote services. The present invention is not necessarily so limited and fully contemplates selecting multiple devices for remote services and/or an automated process where the device selected for remote service is determined according to operational conditions of the mobile device 112 and/or certain triggers, e.g., remote services may be automatically engaged when attempting to access television services that are not compatible with the mobile device.

Figure 14:
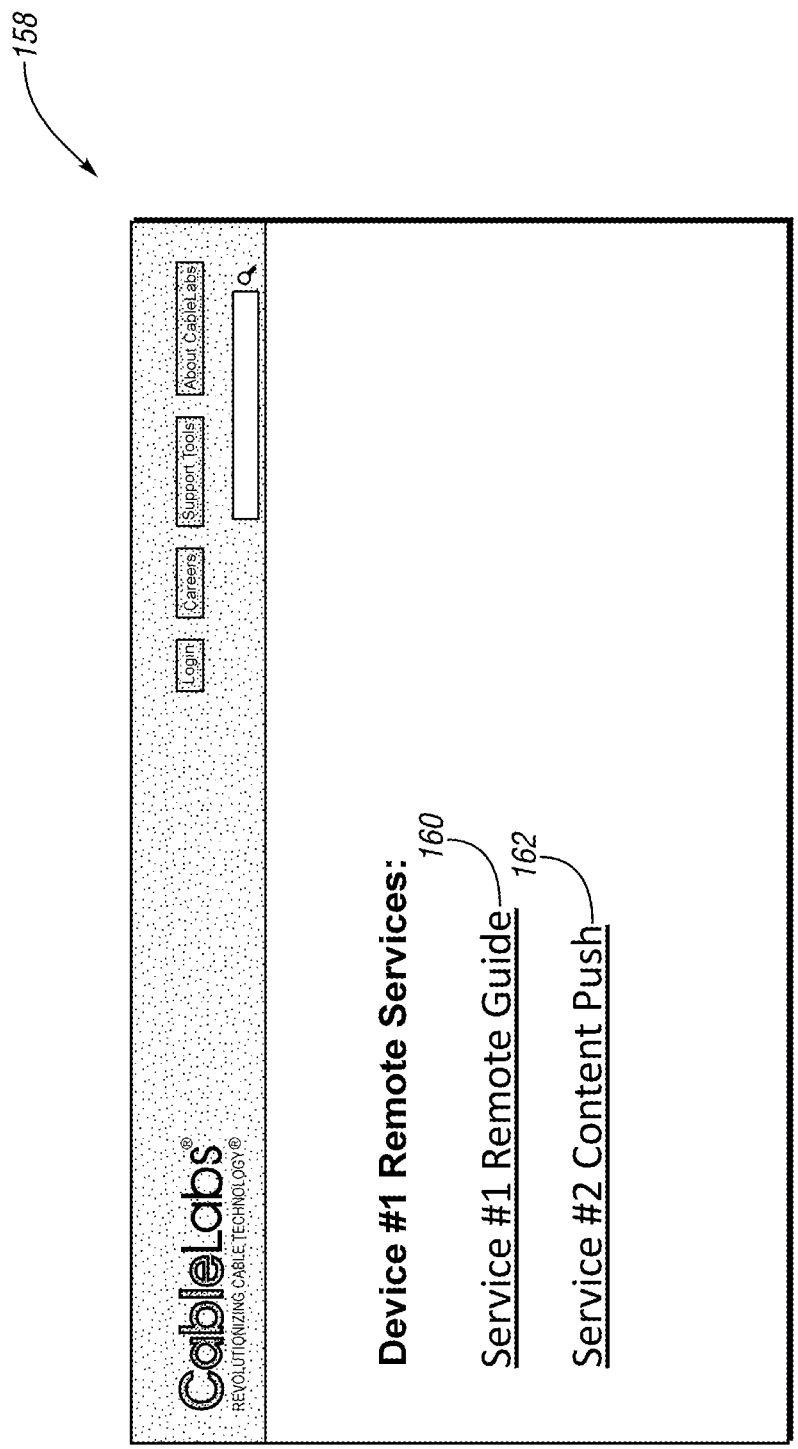
FIG. 14 illustrates a remote services selection webpage in accordance with one non-limiting aspect of the present invention.

A download 156 of a remote services selection webpage 158 may occur in response to user selection of one of the device links 148 illustrated within the personalized services webpage 144. FIG. 14 illustrates the remote services selection webpage 158 in accordance with one non-limiting aspect of the present invention. The remote services selection webpage 158 is illustrated with respect to selection of the first remote device and a plurality of television services available for remote session through the first device, i.e., the television 116. The remote services selection webpage 158 may designate any number of services as being available for projection through the television 116 and illustrates two services for exemplary non-limiting purposes. A first television service 160 is associated with initiating a remote guide application through the television 116 and a second television service 162 is associated with initiating a content push to the television 116. A service token request 166 may be transmitted from the mobile device to the server in response to selection of one of the first and second television services 160, 162. The service token request 166 may correspond with the mobile device 112 requesting to initiate a corresponding remote session sufficient to facilitate projecting the corresponding service through the television 116.

The service token request 166 may include information associated with the service desired for projection and the user requesting the projection. The service desired for projection may be identified with an application ID or other ID associated with the corresponding service. The user requesting the projection may be identified with inclusion of the identification token. The server 114 may process the application ID and the identification token in order to assess whether the corresponding user is authenticated to access the requested television service and/or authenticated to utilize the requested television service through a remote session with the television 116, e.g., the television 116 and/or an owner associated with the television may restrict or place other limitations on those that may control the television through remote session in order to enable parental control or other preference restrictions. In the event the server 114 or other authenticating entity, such as a trusted third-party, authentication the service token request 166, a download 168 of a corresponding service token may occur. The service token may be downloaded to the mobile browser in order to enable subsequent distribution of the service token when facilitating the corresponding remote session.

Following download of the service token, the mobile web browser may automatically initiate transmission of the service token to the television 116 as part of a transfer service token message 170. The transfer service token message 170 may be generated with an administrative agent operating on the mobile device 112 providing instructions through a bridge to a corresponding administrative agent operating on the television 116. The transfer service token message 170 may include DOM instructions or other information sufficient to facilitate updating a DOM generated by the television browser to support the previously downloaded remote services waiting webpage 124. The DOM instructions may force transmission of a service token message 174 from the television browser without user interaction at the television 116. The service token message 174 may include the service token transferred from the mobile device 112. The transferred service token may include information sufficient to identify the service desired for projection or transfer to the television 116. Optionally, the service token may omit identifying information and/or other authentications on the presumption that the television browser would not be in possession of the service token unless granted access from the mobile device 112 previously provided the service token.

A download 176 of a remote services active webpage 178 may occur in the event the server authenticates the service token or otherwise processes the service token to determine the service desired for remote access, optionally verifying usage of the service token and/or related service/application. This may include providing the television browser a Uniform Resource Locator (URL) in order to direct the television browser to a Web server configured to deliver the television service desired for remote session through the television. Optionally, a multiple step process may occur where one step includes providing the service token and another step relates to receiving the URL, which may be facilitated with Asynchronous JavaScript (AJAX). The remote services active webpage 178 associated with the URL may loaded as a completely new page, a new page in an iframe in the existing page or with another AJAX call.

Figure 15:
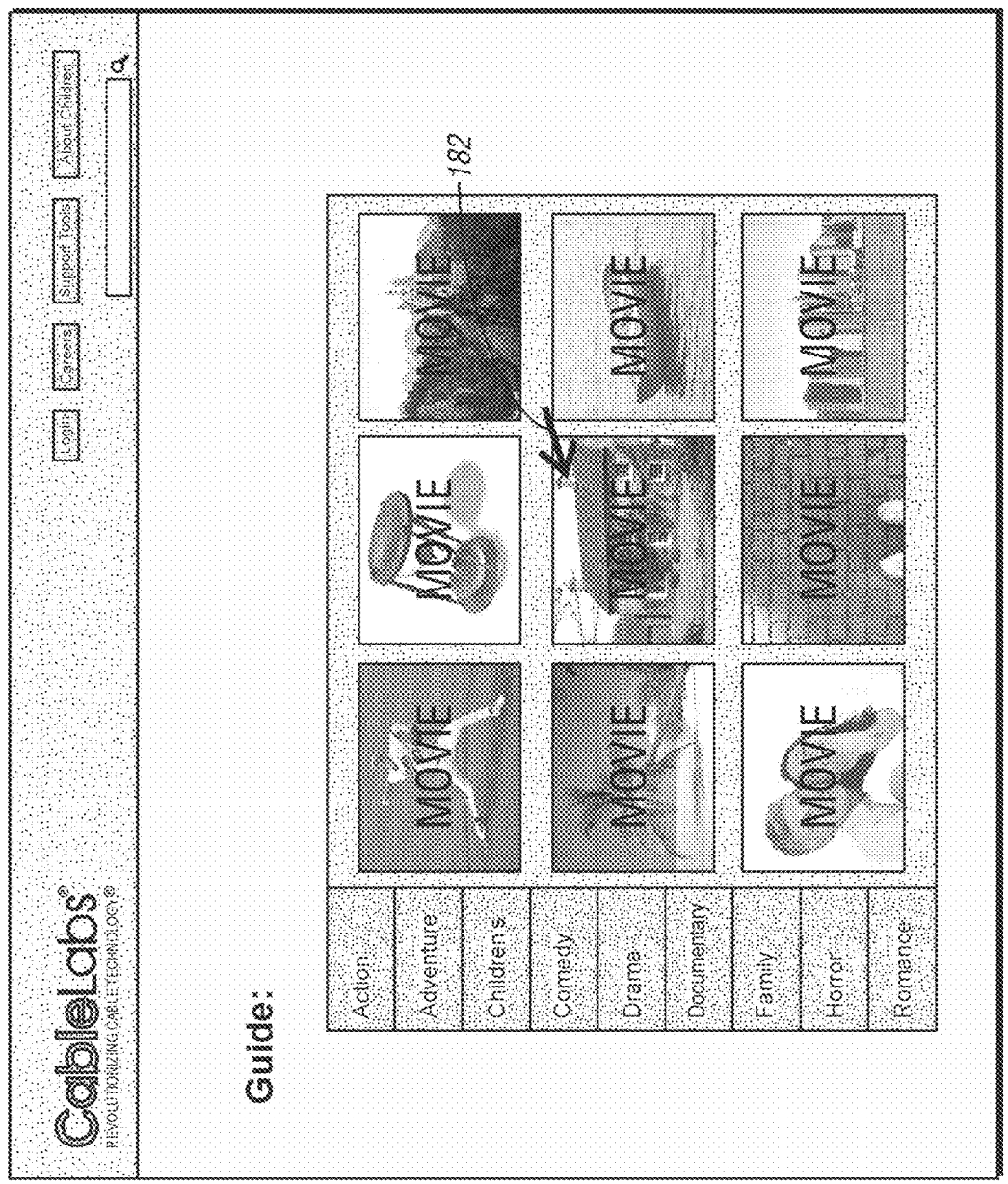
FIG. 15 illustrates a remote guide service in accordance with one non-limiting aspect of the present invention.

FIG. 15 illustrates the remote services active webpage 178 following selection of the remote guide service 160 in accordance with one non-limiting aspect of the present invention. The remote guide application may be used to enable web delivery of an electronic programming guide (EPG) or other navigational feature to the television. Following transmission of the transfer service token message, the mobile browser may automatically download a remote controller webpage 180. The remote controller webpage 180 may be utilized to facilitate second screen or remote control of the remote services active webpage downloaded to the television. The remote control may be facilitated through communication of DOM instructions through the bridge between the mobile browser and the television browser in order to change attributes of DOM objects associated with the DOM used to render the remote services active webpage 178. The DOM instructions may be exchanged in the manner described above in order to facilitate implementing desired controls at the television browser without having to transmit corresponding request to the server to facilitate implementation of the desired controls.

Figure 16:
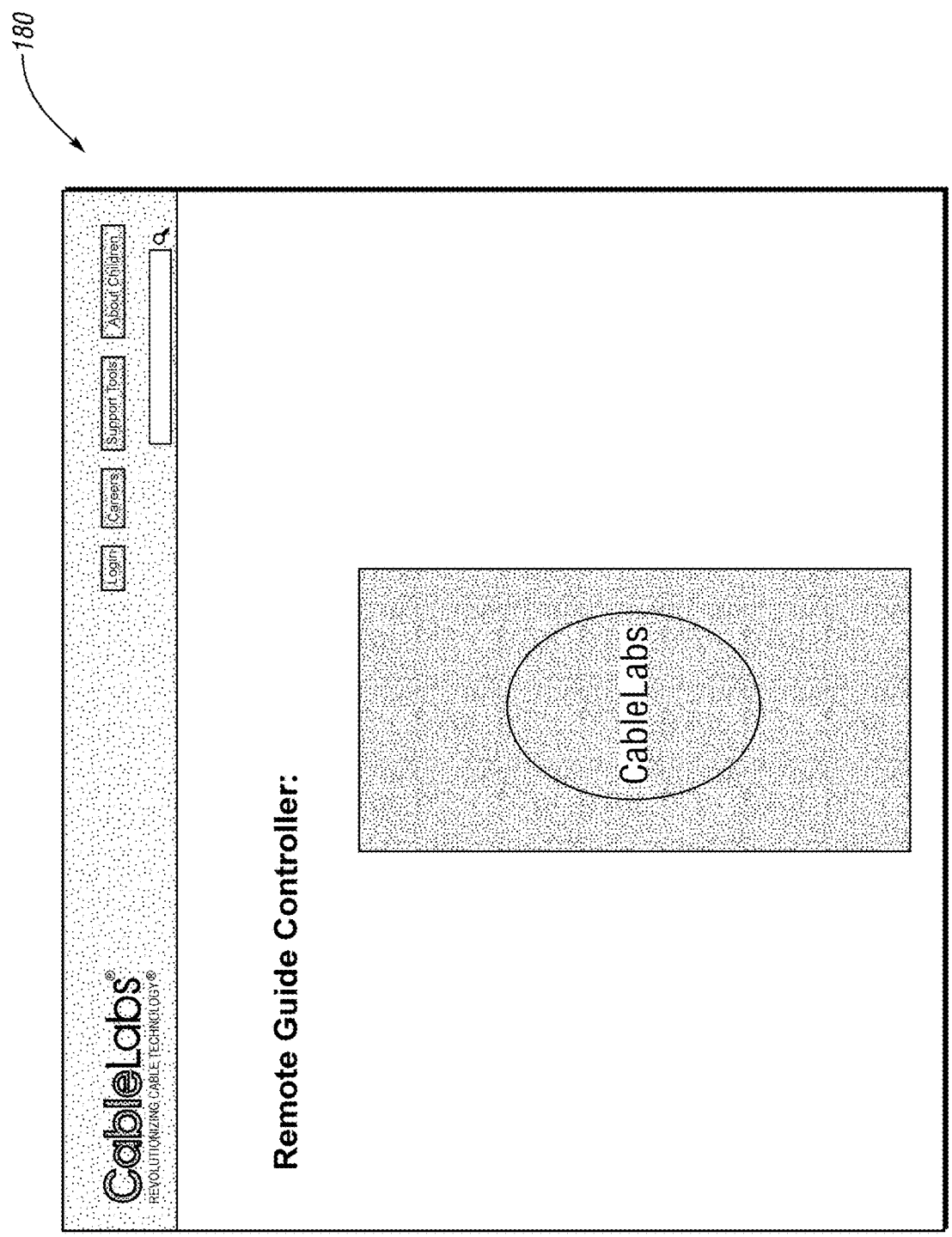
FIG. 16 illustrates the remote controller webpage following selection of the remote guide service in accordance with one non-limiting aspect of the present invention.

FIG. 16 illustrates the remote controller webpage 180 following selection of the remote guide service 160 in accordance with one non-limiting aspect of the present invention. The remote controller webpage 180 may be used to download a remote guide controller application or to otherwise utilize the mobile device 112 as a touchscreen. User interaction with the touchscreen or other movements on the mobile device may be communicated by way of the remote guide controller application, such as using corresponding DOM instructions communicated as part of a remote control static device message, to implement a corresponding movements and interactions at the television browser, e.g., to facilitate moving a cursor 182 shown within the television browser. This capability may be beneficial in allowing the mobile device 112 to be used as a second screen operator for the guide downloaded to the television browser, which may be beneficial in the event the user desires to provide user inputs to the mobile device 112 while relying on the enhanced capabilities of the television browser to present more selectable options and/or to present other types of information that may not be desirably presented through the mobile device 112 for selection.

Figure 17:
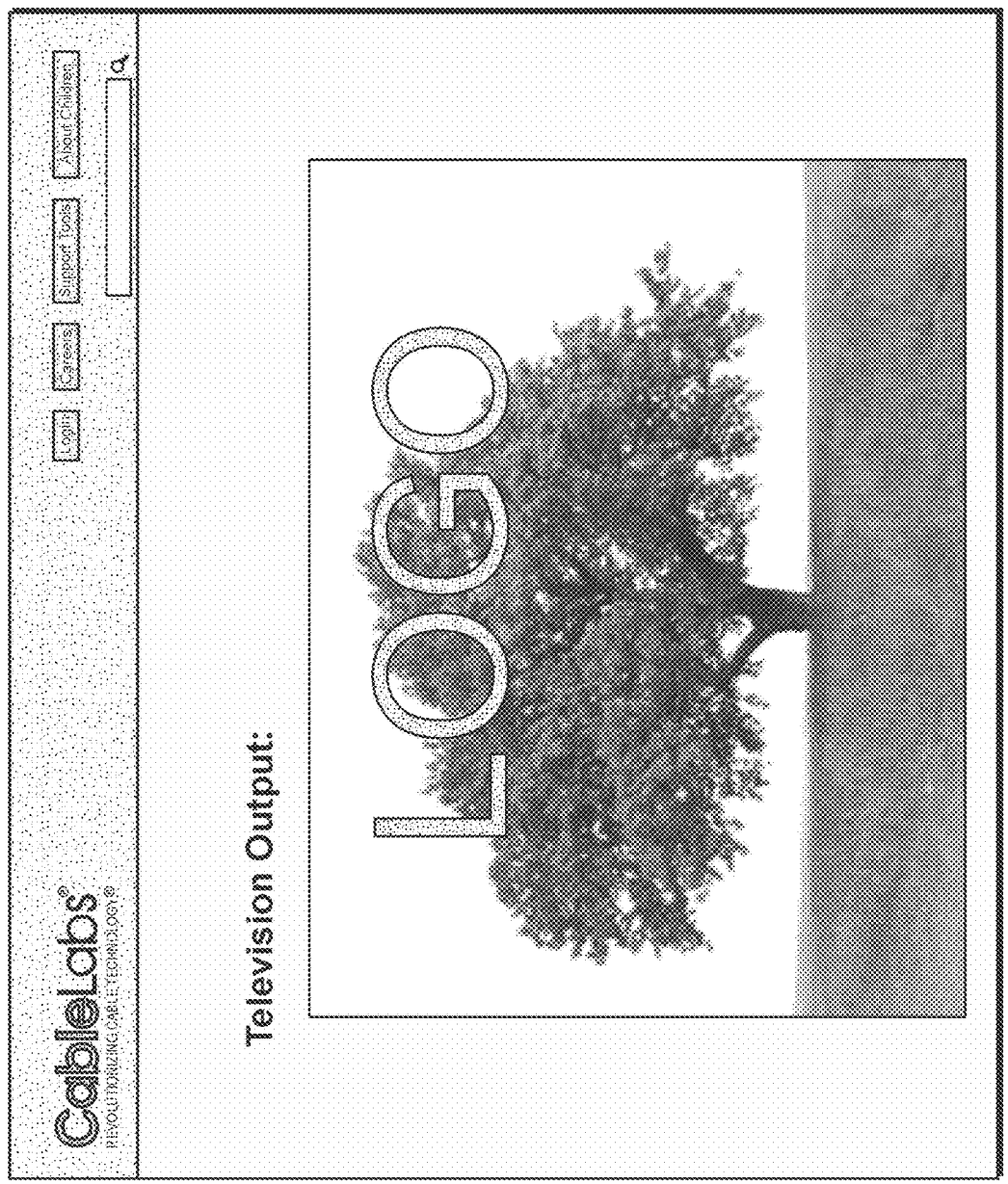
FIG. 17 illustrates a content push service in accordance with one non-limiting aspect of the present invention.

FIG. 17 illustrates the remote services active webpage 178 following selection of a content push service 162 in accordance with one non-limiting aspect of the present invention. The content push application may be used in order to begin playback of content or other media utilizing the capabilities of the television 114. The content desired for push to the television 114 may be selected through the mobile device 112, such as a function of interactions with a content push webpage (not shown) used to display a plurality of pieces of content that may be pushed to the television. The content push webpage or content selection webpage may be displayed and/or downloaded to the mobile device 112 following selection of the content push application 162 shown within the remote services selection webpage 158. The service token resulting from the selection may identify the content ID associated with the content desired for pushing such that receipt of the corresponding service token prompts the television browser to automatically begin playback of the desired content, i.e., DOM instructions provided to the television browser may be used to automatically instigate download and play of the desired content.

Figure 18:
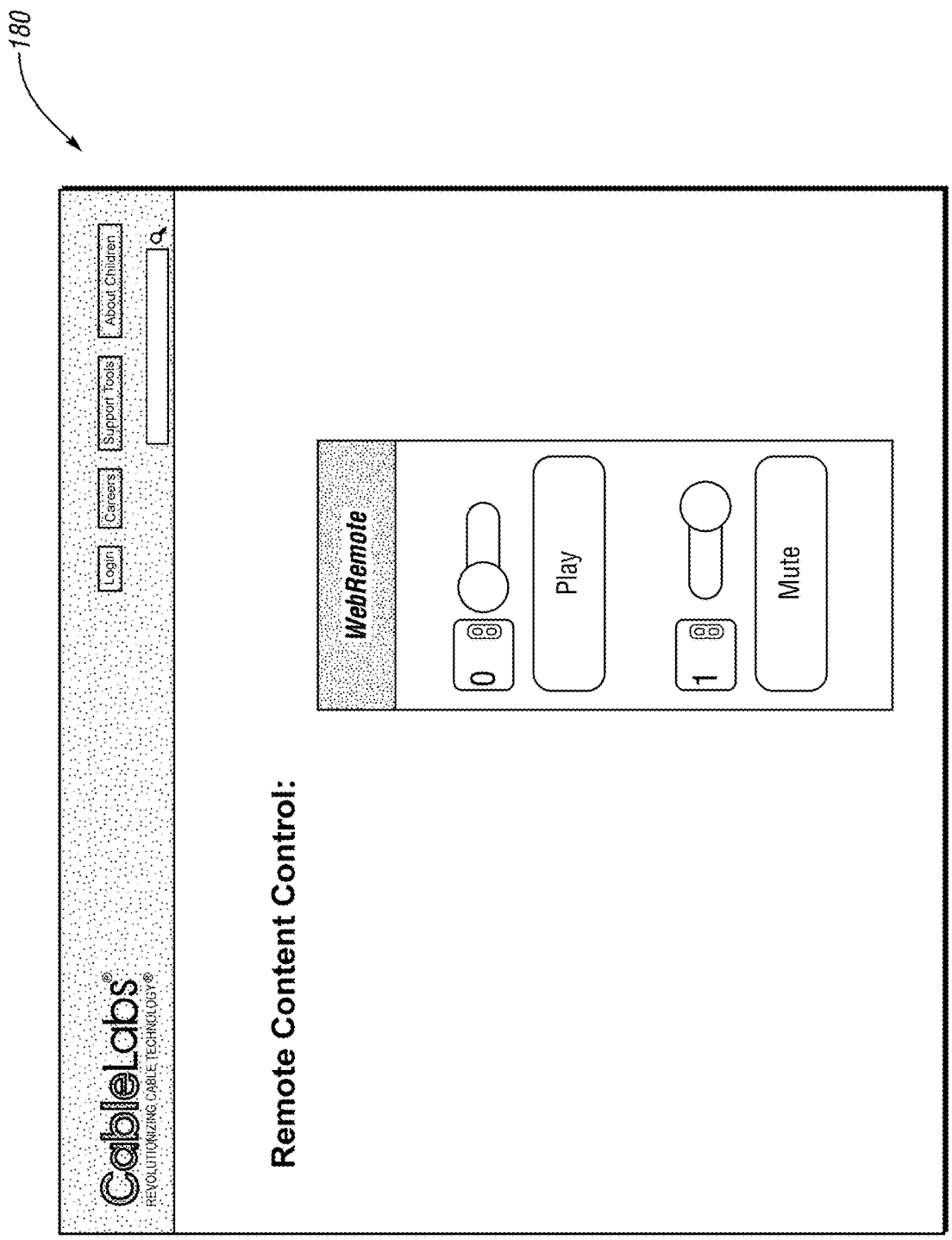
FIG. 18 illustrates the remote controller webpage following selection of the content push service in accordance with one non-limiting aspect of the present invention.

FIG. 18 illustrates the remote controller webpage 180 following selection of the content push service in accordance with one non-limiting aspect of the present invention. The remote controller webpage 180 may be used to download a remote content controller application to control play of the content push to the television. User interaction with the remote content controller may be communicated by way of the remote guide controller application, such as using corresponding DOM instructions communicated as part of the remote control static device message, to implement a corresponding movements and interactions at the television. This capability may be beneficial in allowing the mobile device 112 to be used as a second screen operator for controlling content play through the television browser, which may be beneficial in the event the user desires to control play through the mobile device 112 while relying on the enhanced capabilities of the television 116 to present the content for viewing.

Figure 19:
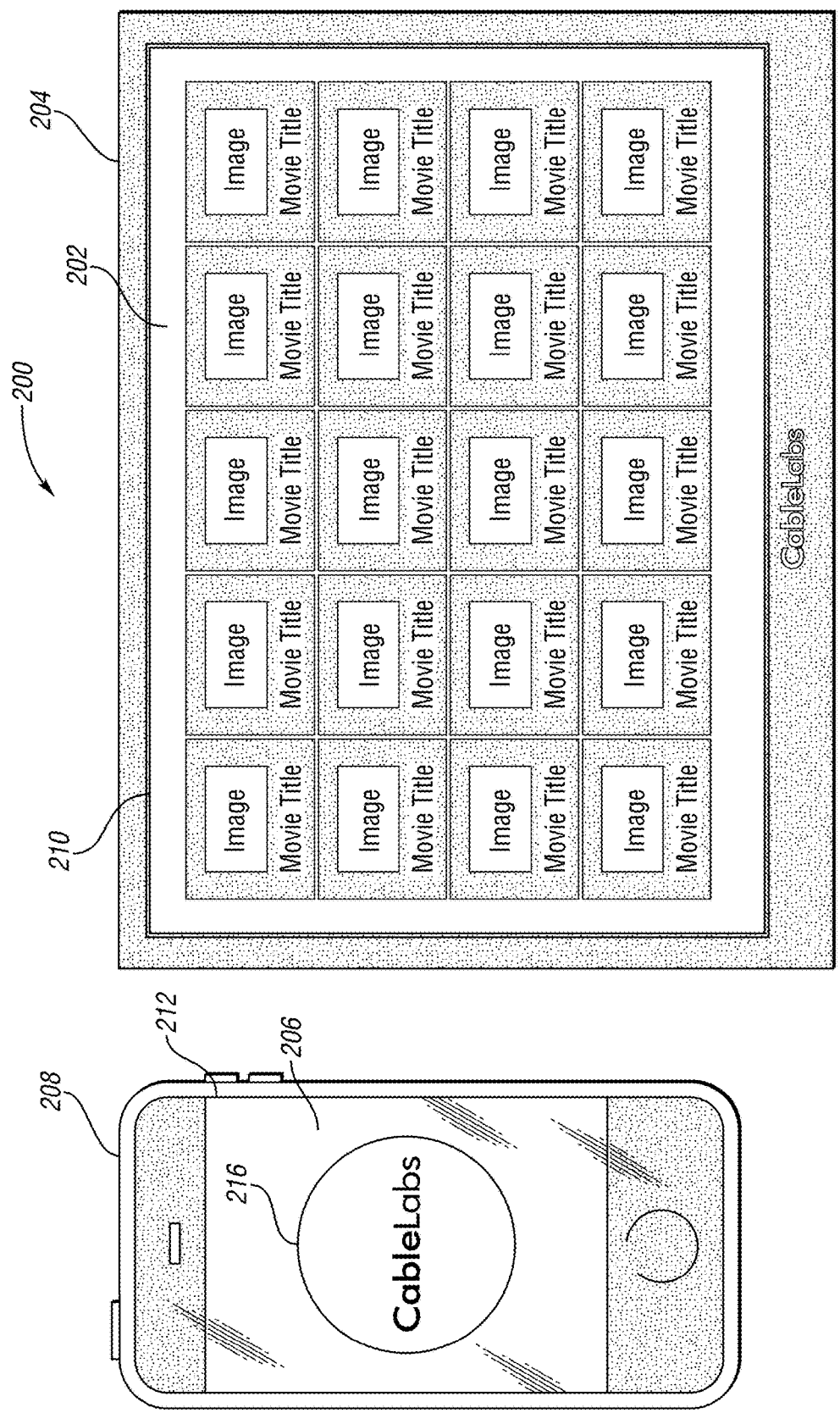
FIG. 19 illustrates a touchscreen system in accordance with one non-limiting aspect of the present invention.

FIG. 19 illustrates a touchscreen system 200 in accordance with one non-limiting aspect of the present invention. The system 200 is shown to include a first Web page 202 displayed on a display device 204 and a second Web page 206 displayed on a touch device 208 in accordance with one non-limiting aspect of the present invention. The display device 204 may correspond with the above-described first client 14 and/or proximity device 116 or another device having a first display 210 and capabilities sufficient to facilitate the operations contemplated herein. The touch device 208 may correspond with the above-described second client 56 and/or mobile device 112 or another device having a second display 212 and capabilities sufficient to facilitate operations contemplated herein, including but not limited to additional devices having capabilities sufficient to facilitate touch-screen or capacitive touch operations and/or capabilities sufficient to facilitate interacting with an embedded trackball and/or mouse (not shown). One non-limiting aspect of the present invention contemplates facilitating control of the first Web page 202 displayed through the display device 204 according to user interaction with the second Web page 206, such as in response to manipulation of buttons, features or other operands associated with the second Web page 206, and/or according to user interaction with the second device 208, e.g., such as in response to user dragging a finger or stylus across the second display 212 and/or manipulating the trackball to move a cursor (not shown) within the second display 212, which may occur without actuating a button, link or other feature within the second Web page 206.

The first Web page 202 is shown to correspond with a video grid where a plurality of video images are shown to represent videos that may be selected for viewing, such as through Web server streaming, video-on-demand (VOD) or some other delivery mechanism. Each of the video images may correspond with an underlying link, address or other information sufficient to instigate download/delivery of the corresponding video to the display device. The second Web page 206 is shown to correspond with a touch screen image representative of a simulated mouse pad or interface understood by a user to correspond with the metes and bounds of an operating space through which commands may be instigated. The second Web page 206 is shown to include a designation of a corresponding service provider shaped to provide a target 216, which may be positioned and shaped near a center of the display 212 to demarcate a center or other representation regarding the metes and bounds of the operating space. The second Web page 206 is shown to be devoid of buttons, menus or other user selectable items. Of course, the use of such user selectable items is contemplated, particularly with respect to selectable options sufficient to facilitate navigation to other Web pages, accessing Web browser options or tools, instigating control of the first Web page 202, etc. One non-limiting aspect of the present invention contemplates utilizing touchscreen capabilities of the second display 212 to facilitate manipulation of the first Web page 202 without having to actuate user selectable features represented within in the second Web page 206.

Figure 20:
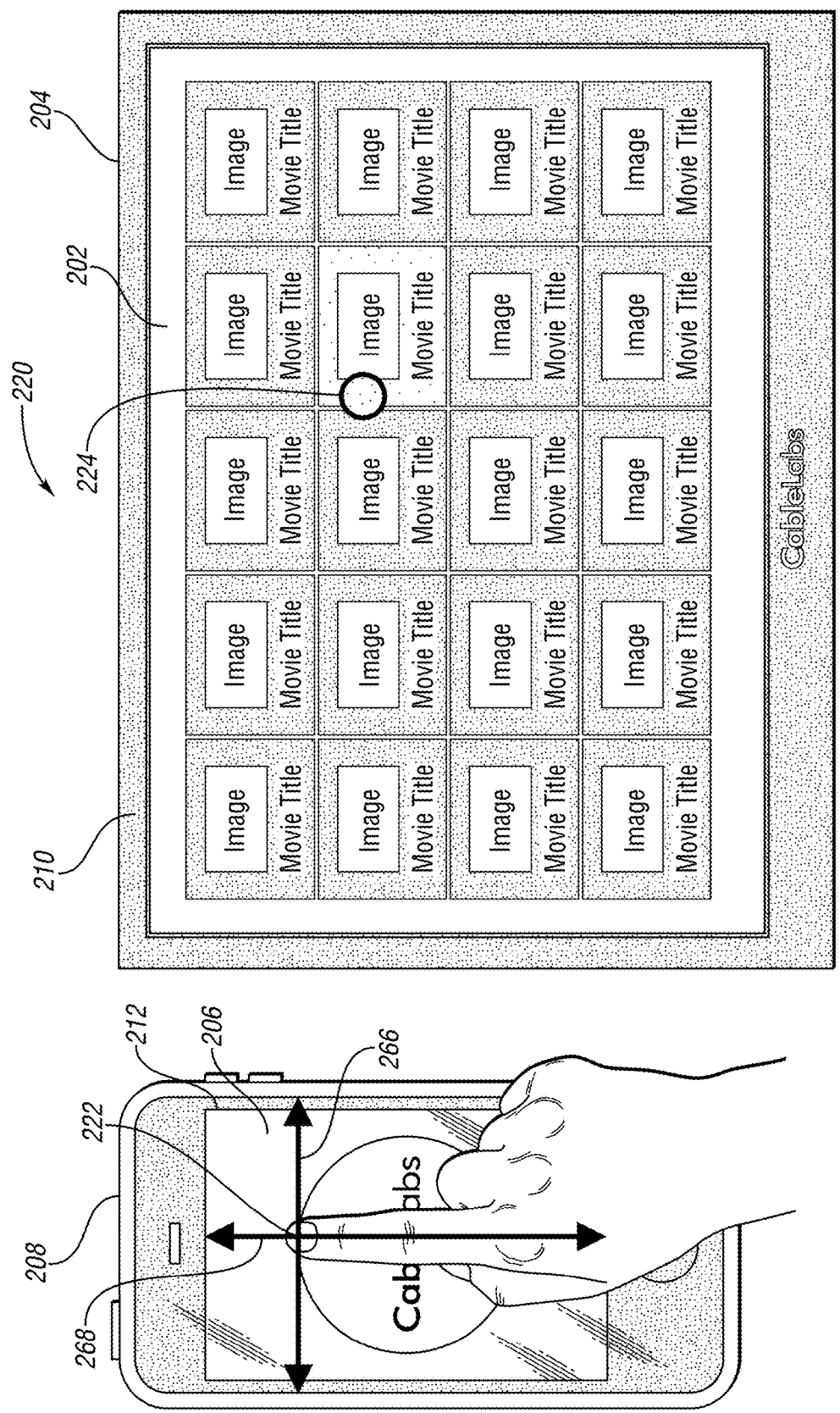
FIG. 20 illustrates a touchscreen implementation in accordance with one non-limiting aspect of the present invention.

FIG. 20 illustrates a touchscreen implementation 220 in accordance with one non-limiting aspect of the present invention. The touchscreen or touchpad implementation 220 may correspond with use of the second device 208 to facilitate controlling operations of the first device 204, such as through manipulation of the first Web page 202. The manipulation of the first Web page 202 or other desired manipulations of the first device 204 may be accomplished according to user interaction with the touchscreen 212 of the second device 208. One non-limiting aspect of the present invention contemplates facilitating manipulation of the first Web page 202 as a function of a user dragging a capacitive element 222 (e.g., finger, stylus, etc.) across the touchscreen 212 whereby a cursor 224, shown as a bubble for exemplary non-limiting purposes, moves within the first Web page 202 in concert with the capacitive element 222. Optionally, the manipulation provided through the second device 208 may be facilitated without displaying user selectable buttons, menus or the like within the second Web page 206, which may be beneficial in eliminating the need for the second Web page 206 or corresponding second Web browser to be aware of the content of the first Web page 202 or corresponding first Web browser, i.e., a DOM used to create the first Web page 202 need not necessarily be published to the second device 208. The present invention, of course, is not necessarily so limited and fully contemplates the second Web page 206 including user selectable items, optionally in addition to or in place of the touchscreen image 216, to facilitate controlling the second device 208 and/or the second Web page 206.

Figure 21:
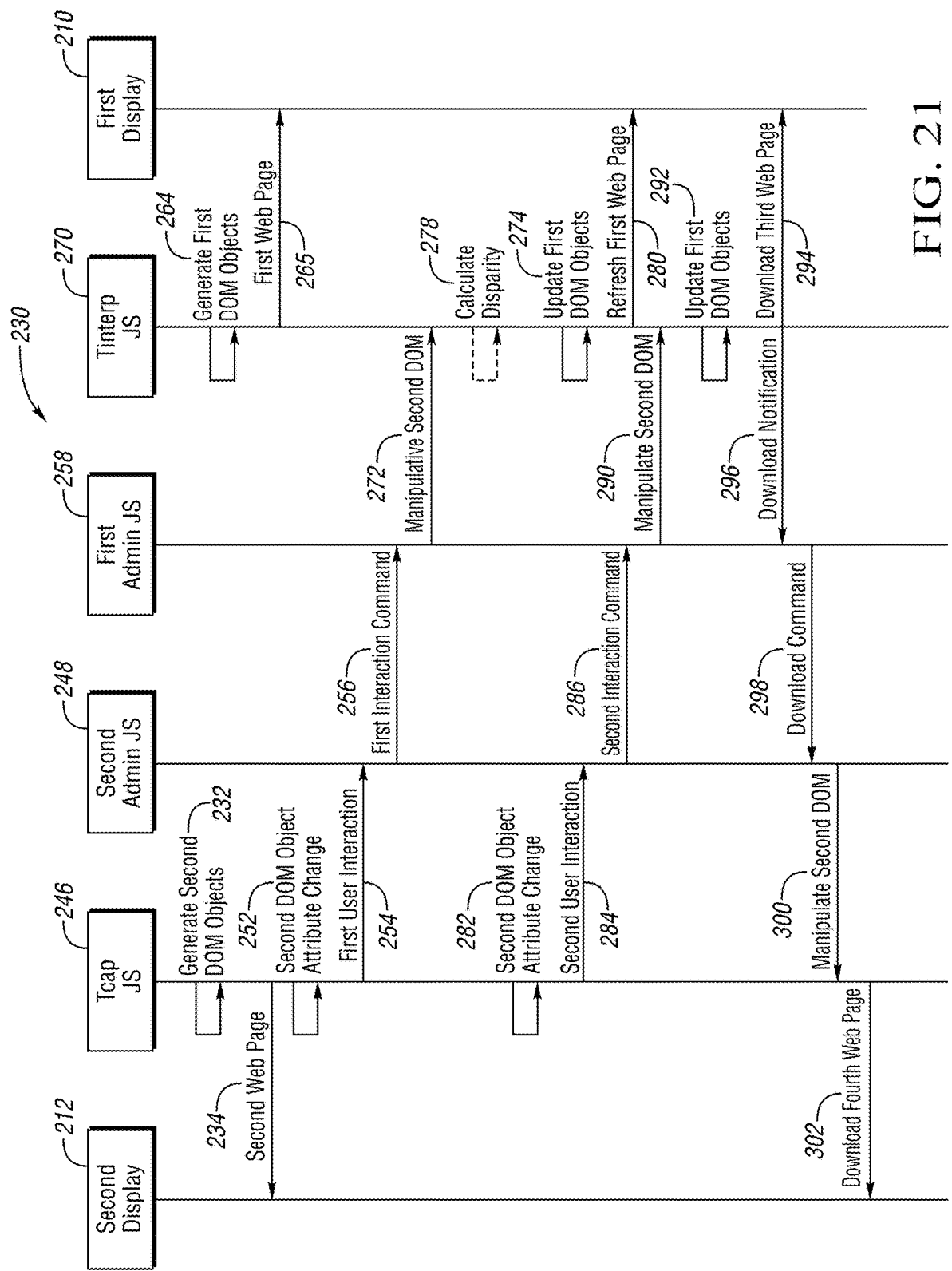
FIG. 21 illustrates an operational diagram for touchscreen manipulation in accordance with one non-limiting aspect of the present invention.

FIG. 21 illustrates an operational diagram 230 for touch-based manipulation in accordance with one non-limiting aspect of the present invention. The contemplated manipulation is predominately described with respect to facilitating manipulation of the first device 204 and/or the first Web page 202 according to user interaction of the second device 208 and/or the second Web page 206, such as according to capacitive user interaction (touchscreen) or mechanical user interaction (mouse, trackball) where the second device 208 need not unnecessarily display features unique to the first device 204 and/or the first Web page 202. A plurality of second DOM objects 232 may be generated to facilitate generating 234 the second Web page 206 showing within the second display 212. FIG. 22 illustrates DOM objects 238 associated with touch-based manipulation in accordance with one non-limiting aspect of the present invention. The second Web browser 240 may generate the second DOM objects 232 as a function of data included within the downloaded second Web page 206. While various DOM objects may be generated, the second DOM objects 232 are shown to include an image object 244, a touchcapture (tcap) JavaScript (JS) object 246 and a second administration agent (admin) JS object 248. The image object 244 may be associated with displaying the service provider image (target) 216 illustrated within the second Web page 206, the tcap JS object 246 may be generated to register the capacitive and/or mechanical interactions and the second admin JS object 248 may be configured to perform administration operations, such as in the manner described above with respect to the administration agents 18, 58 (admin JS object 246 need not necessarily be a DOM object and may be a standalone application or other component operable with the Web browser 234).

Following manipulation or changes 252 to attributes associated with the tcap JS object 246 or other non-illustrated DOM objects that may be used to facilitate the contemplated operations, a first user interaction 254 may be registered with the second admin JS object 248. The second DOM object attributes 252 may change, for example, in response to a user dragging the capacitive element across the second display 212 and/or in response to movement of a cursor or trackball associated with the second device 208. The first user interaction 254 is predominately described with respect to the capacitive device 222 engaging the second display 212 and thereafter remaining engaged while moving to another portion of the second display 212, whereby movement may be further continued without disengagement and/or the capacitive element 222 may be disengaged. This is done for exemplary non-limiting purposes as the present invention fully contemplates various operations and engagements being performed to facilitate manipulation of the first device 204. The capability to facilitate manipulating the first device 204 while operating the second device 208 as a touch screen is believed to be particularly beneficial in facilitating second screen applications and/or second screen control of a primary screen, such as when watching video and/or television, navigating electronic programming guides, Web surfing and performing any number of other operations where it may be desirable to use a larger or more robust display device while facilitate control through a mobile phone, handheld device or other device.

The contemplated touch screen control may have broad applications and uses with the ever increasing prevalence of smart phones and other mobile devices having built-in touchscreens. One non-limiting aspect of the present invention envisions operating the second device 208 in place of an IR remote control typically used to control a television, set top box (STB) or gateway to facilitate user selection and navigation of displayed content. The touchscreen device may facilitate navigation with greater ease than that provided with relatively limited, button-dependent input capabilities of traditional remote controls. At least with respect to remote controls that rely upon button depressions, the contemplated touchscreen control may allow a user to perform controlling gestures with their fingertips without having to identify and physically press buttons, which may provide a more intuitive feel and an enhancement of the user experience. When a finger element engages the second display 212 to cause the first user interaction 254, the second admin JS object 248 may responsively generate a first interaction command 256 suitable for transmission to a first admin JS object 258 associated with a first DOM 260 of the first Web browser 262. The first interaction command 256 may be used to convey various pieces of information to the first admin JS object 258 in order to facilitate the contemplated manipulation and/or control of the first device 204 and/or the first Web page 202.

The first interaction command 256 may include touchstart information related to a beginning of the engagement and/or touchmove information related to continued, uninterrupted movement following the initial engagement. The touchstart and/or touchmove information may be included within a single message and/or multiple messages associated with the first interaction command 256. The touchstart and touchmove information may include positional information defining positioning of the user's finger relative to an x-y coordinate system defined by the second display 206. The touchstart may be used to identify initial, x-y positioning of the finger 222, i.e., as a single set of values, and the touchmove information may identify the following x-y positioning(s), i.e., as multiple set of variables. As shown in FIG. 20, finger positioning and movement within the second display may be defined with a horizontal vector 266 and a vertical vector 268, the horizontal vector 266 relates to a y value or position along a y axis and the vertical vector 268 relates to an x value or position along an x axis. The x-y positioning information may correspond with the x and y values coinciding with finger positioning at a particular instance in time. The engaged movement of a finger 222 from one position to another position of the second display 212 may generate multiple pieces of x-y positioning information depending on the sampling interval.

One non-limiting aspect of the present invention contemplates sampling finger movement at an interval sufficient to facilitate real-time movement monitoring, which may include generating x-y positioning information each time the finger 222 traverses a single pixel or a subset of pixels used to define the metes and bounds of the first display 212. This sampling of positional information may be based on the resolution or other mechanical/physical aspects of the second display 212 and/or the portion of the second display 212 being used to facilitate the touch screen control. Other types of sampling may be based on time, events or other operations, e.g., sampling movement every 30 ms or at a rate faster than recognizable with the human eye. The ability to sample user interaction at the second device 208 at a sufficient rate may be helpful in manipulating movement of the cursor 224 within the first display 210 in real-time with movement of the user's finger and/or other gesture. In the event the first display 210 is larger or has a different aspect ratio than the second display 212, additional information may be included within the positional information carried with the first interaction command to facilitate positioning the cursor 224. The additional information is shown to correspond with hmax and vmax, which may be used to represent the maximum height (hmax) and maximum with (vmax) of the second display 212.

The first interaction command 256, and optionally any additional positioning information and/or messages associated therewith, may be transmitted to the first admin JS object 258 associated with the first DOM 260 generated with the first Web browser 262 operating on the first device 204 to display the first Web page 202 (see FIG. 22). The first Web browser 262 may generate a plurality of DOM objects 264, including but not necessary limited to the first admin JS object 258, a first Web page image (img1) object 266, a cursor (curs) object 268 and a touch interpretation (tinterp) object 270 and/or any additional objects necessary to facilitate rendering 265 the first Web page 202, including facilitating manipulation of menus, buttons or other options include with the first Web page 202 that may not necessarily be related to manipulating control the first Web page 202 according to instructions and/or other information provided from the second device 208 and/or the second admin JS object 248. The img1 object 266 may be configured to facilitate graphically rendering images, graphics, video icons and/or other images or content desired for visual representation within the first Web page 202. The curs object 268 may relate to a DOM object configured to facilitate displaying the cursor 224 for the first interaction command 256. The curs object 268 may be downloaded as part of the first Web page 202 and/or independently loaded, such from an application or other program operating on the first device 204 to facilitate the contemplated touchscreen operations.

The tinterp JS object 270 may be configured to control the curs object 268 in order to facilitate controlling movement of the cursor 224 according to the first interaction command 256 and/or the positioning or other information included therewith. The first Web browser 262 may generate the tinterp JS object 270 when creating the first DOM objects (see FIG. 21) to facilitate rendering of the first Web page 202. The first Web page 202 may be downloaded to the first device 204 in advance of receiving the first interaction command 256, such as in response to a user activating a remote control application or otherwise preparing the first device 204 to facilitate the contemplated touchscreen control. The first Web page 202 may be downloaded in response to a download instruction provided from the second device (not shown) issued following activation of a touchscreen application prompting the second device 208 to download the second Web page 206, and/or the first Web page 202, and optionally the second Web page 206, may be downloaded in response to other operations, such as but not necessary limited to a push or other control instigated through a service provider having access to or control of the first and/or second devices 204, 208. As illustrated above with respect to FIGS. 19 and 20, the contemplated touchscreen operation predominately relates to facilitating manipulation of the first device 204 and/or the first Web page 202 following download of the first and second Web pages 202, 206 to the respective first and second devices 204, 208, the download of which is not necessary intended to limit the scope and contemplation of the present invention.

The first admin JS object 258 may be configured to generate a manipulate second DOM command 272 or to otherwise provide instructions sufficient for use in performing a first DOM objects update 274. The first DOM object updates 274 may include the tinterp JS object 270 varying its own attributes or the attributes of other first DOM objects according to the first interaction command 256. With respect to the exemplary description of the first interaction command 256 relating to a user dragging a finger across the second display, the first admin JS object 270 may be configured to implement corresponding attribute changes to the first DOM objects in order to facilitate corresponding movement of the cursor 224 within the first Web page 202. As shown in FIG. 20, the cursor movement may be used to highlight a particular one of the video cells. The video cells may be highlighted in a rollover operation or other process where characteristics of the highlighted video cells may be differentiated relative to the non-highlighted video cells. The tinterp JS object 270 may include capabilities sufficient for identifying links or other callouts associated with the video cells or other information displayed within the first Web page 202. Once the links or other callouts are identified, the tinterp JS object 270, the cursor object 260 and/or other first DOM objects may be manipulated in order to facilitate generating corresponding highlights or other references to the links, i.e., each link may be highlighted or otherwise enhanced when positioned underneath the cursor 224.

The tinterp JS object 270 may generate x-y positional information, similar to the x-y positional additional information generated with the tcap JS object 246, to facilitate positioning the cursor 224 within the first display 210, and thereby, identifying the underlying links. The positioning of the cursor 224 within the first display 210 and/or the first Web page 202 may be proportional to the positioning of the finger 222 within the second display 212 and/or the second Web page 206. One non-limiting aspect of the present invention contemplates demarcating the meets and bounds of the first Web page 202 within the second Web page 206 such that each combination of x-y positional values generated through the second Web page 206 correspond with a unique combination of x-y positional values for the first Web page 202. In this manner, when the finger 222 travels from a leftmost side to a rightmost side of the second Web page 206, the cursor 224 represented within the first Web page 202 similarly travels from a leftmost side to a rightmost side. The translation of x-y positional values generated for the first Web page 202 and the second Web page 206 may be calibrated with an optional disparity calculation 278. The disparity calculation 278 may be used to relate the hmax and vmax values for the second Web page 206 and/or the second display 212 to corresponding hmax and vmax values for the first Web page 202 and/or the first display 210 in order to generate a proportional relation between the first Web page 202 and the second Web page 206 sufficient to achieve the desired real-time movement of the cursor 224 relative to the finger movement.

Following updating of the first DOM objects 274, a refresh first Web page process 280 may occur. The refresh first Web page process 280 may include adapting the visual representation and/or non-visual representation of the first Web page 202 through the first display 210, optionally, without requiring the first Web browser 262 to re-download the first Web page 202 or to otherwise communicate with an upstream server. The refresh, for example, may include a real-time sequence of refreshes where the first Web page 202 is refreshed to illustrate movement of the cursor 224 in real-time with the finger movement. The manipulation of the first Web page 202 in this manner is characterized as a refresh without intending to limit the scope and contemplation of the present invention as the refresh generally relates to updating the first Web page 202 and/or information shown within the first Web page 202, including highlights or other callouts, as a function of the first interaction command 256 and/or positional information included therewith, in order to present or simulate real-time interaction with the first Web page 202 as a function of user interaction with the second Web page 206 and/or the second device 208. The refresh of the first Web page 202 may occur without re-generating the video icons or otherwise downloading the images and other content showing within the first Web page 202, i.e., the rollover highlighting of the video cells or other links within the first Web page 202 may occur without having to manipulate the substance of the first Web page 202.

The finger movement following engagement with a first position of the second display 212 and following dragging (continuous contact) to a second position may correspond with the first interaction command 256 including multiple positional coordinates and/or messages, as described above. The release or disengagement of the finger 222 from the second device 208 may correspond with a second update 282 of the second DOM objects and/or registration of a second user interaction 284 with the second admin JS object 248. FIG. 23 illustrates updating DOM objects 286 associated with touch-based manipulation in accordance with one non-limiting aspect of the present invention. Updating of the second DOM objects 286 may include transmission of a corresponding second interaction command 286 from the second admin JS object 248 to the first admin JS object 258. The second interaction command 286 is shown to correspond with a touchend intended to represent positioning with the second Web page 202 when the finger 224 is disengaged from the second display 212 following the engaged movement noted with respect to the first interaction command 256. The touchend command may include similar x-y positioning information, i.e., x and y values and hmax and vmax values, in order to facilitate determining corresponding positioning with the first Web page 202.

The first admin JS object 258 may be configured to generate a manipulate second DOM command 290 or to otherwise provide instructions sufficient for use in performing another update 292 of the first DOM objects according to the second interaction command 286. This additional updating of the second DOM objects may correspond with selection of a link underlying the current positioning of the cursor 224 within the first Web page 202 as dictated by the x-y positional information included within the second interaction command 286. In the event the link associated with another Web page, the corresponding Web page, illustrated as a third Web page, may be automatically downloaded 294 without further user interaction for rendering at the first display 210. The selection of the link in this manner may be beneficial in facilitating download without requiring the user to second Web page 206 and/or without requiring the user to perform a double-tap, i.e., the selection may occur automatically upon disengagement of the finger 224 from the second display 212. One non-limiting aspect of the present invention contemplates facilitating navigation of the video grid in order to download or otherwise instigate a playback process for the selected video, which may be achieved with download of the third Web page 294.

An optional download notification 296 may be registered with the first admin JS object 258 according to the corresponding updates to the first DOM objects. The first admin JS object 258 may generate a responsive download command 298 for transmission to the second admin JS object 248. The second admin JS object 248 may generate corresponding manipulation 300 of the second DOM in order to direct the second Web browser to automatically download 302 a fourth Web page. The fourth Web page may be associated with a remote control Web page, such as but not necessary limited to the remote control Web page 80 illustrated and FIG. 6. The remote control Web page 80 may then be rendered through the second display 212 to facilitate controlling playback of the video through the third Web page (see FIG. 4), optionally with manipulation of a video object 306, as a function of user interaction with the second device 208, such as in the manner described above. In this manner, one non-limiting aspect the present invention contemplates a process where the second device 208 may be used to provide touchscreen capabilities beneficial to facilitating touchscreen navigation of content listed within the first display 210, and thereafter, facilitating subsequent remote control according to control features provided within the fourth Web page. This process may be beneficial in improving the user experience and providing an intuitive process having improved performance over traditional remote control processes for navigating to and controlling content playback.

The Web page manipulation described with respect to the flowchart of FIG. 21 is predominately described with respect to operating a second device as a touchscreen or other gesture-based controllable device for use in automatically providing corresponding navigation of a remote Web page as a function of interactions registered through the touchscreen. This is done for exemplary non-limiting purposes as the present invention fully contemplates use of the described touchscreen processes and/or capabilities to facilitate manipulating Web pages, settings and other operational characteristics of another device without necessarily having to visually render the Web page or other setting being manipulated. A non-visual implementation, for example, may include adjusting settings of a stereo according to gestures registered on a touchscreen device. One such operation may include detecting circular gestures or up/down gestures within the touchscreen device and implementing a corresponding volume control of the stereo whereby the volume control is provided in accordance with the gestures and without necessarily displaying a Web page downloaded to the stereo to facilitate stereo operations.

As supported above, one non-limiting aspect of the present invention relates to a method where a Web page executing in a Web browser can be monitored and controlled, without modification to the Web page, by a Web page on another browser or an external application. The invention defines a means whereby any Web page, a MSO Electronic Program Guide on a connected TV for example, can have an arbitrary portion of itself made available to another Web page, a TV remote control app on a smartphone for example, so that the other Web pages can be informed of, and change, the state of the shared Web page. Several example use cases of this invention are: a Web page on a smartphone controlling a EPG Web page; transferring a service such as watching a video from the TV to a tablet; multiple users sharing a Web page and collaboratively interacting with it; and a home automation Web page running on a PC gathering information from Web enabled Smart Home devices.

The method for accomplishing exposure of the Web page to be shared, as contemplated by the present invention, may always be possible, independent of the application, and without requiring modification of the Web page. The invention contemplates: 1) a Web page with state and behavior that may be made available to other Web pages. This may be called the Server Web page. 2) Web pages that have access to and can modify the shared behavior and state. These may be called Client Web pages. A single Web page can act in the role of multiple Servers for state and behavior and as multiple clients. 3) A Web page Bridge that allows Servers and Clients to find and communicate with each other. 4) A protocol between Server and Clients for expressing events and state updates. The Server, Client and Bridge components in the invention are not limited to the use of this protocol.

A Web page may become a Server in accordance with the present invention by including server script functions, for example JavaScript, that: a) detect HTML Document Object Model (DOM) events for DOM objects that are to be shared with Clients, b) connect to a Bridge to establish communication with Clients, c) send detected events to Clients, d) receive messages from Clients. A Web page may become a Client in accordance with the present invention by including client script functions, for example JavaScript, that: a) connect to a Bridge to establish communication with a Server, b) receive and act on detected events from the server, c) maintain the portion of element state shared by the Server, d) send messages back to the Server to update the shared element state. A Bridge is contemplated that: a) allows Server and Clients to connect to a globally unique instance of the bridge for purposes of bi-directional communication of messages, b) informs a Server and Clients when there are new connections to the instance of the Bridge, c) passes any message from one connection on the instance of the Bridge to all other connections, d) informs the first Server or Client on the instance of the Bridge when there are no other connections, e) uses a network protocol for Server and Client connections, WebSockets for example, that allows Server and Clients to connect to the Bridge in a manner not limited by the Internet origin of the Server and Client Web pages and the Bridge. The invention can use other network protocols supported by browsers but there may be associated Internet origin restrictions. Servers may send clients messages consisting of: the server DOM object id, the event type (as defined in the HTML5 specification), a list of (attribute, value) pairs representing the shared state for the object id. The invention defines a new event type for a server to initialize the client. Clients receive these messages and create a remote representation of the object on the server. Clients send a server messages consisting of: the server object id, (attribute, value) pairs, object method names. The server uses these messages to update the DOM object.

The invention allow Script Functions to monitor and control a Web page without modifying the Web page. The invention introduces the idea of a bridge, independent of the Web server, that allows Web client applications to communicate with one another. This is a critical difference from an implementation that relies on a Web server backend application to create the client connections because the invention allows the Web page developer to add script to the web client for communication. This can then be delivered by any standard Web server without server side intervention. The invention also allows clients served from completely independent Web servers to communicate; something not possible if the page server is making the bridge. The invention shows how a protocol over this communication path can be used to link the state of DOM objects among the clients. The client applications do not have to be modified to interact.

The Web server/browser model contemplated by the present invention may be applied to delivering applications in diverse areas such as multimedia service, Internet of things and collaboration. These types of applications may desire the use of one Web page to communicate with another Web page for purposes such as remote control and sharing of information. The present invention contemplates a means for one Web page to create a window in another Web page and serve Web content to that window, however, the process describe above may be preferred because: a) the client knows what is being shared by virtue of the Bridge name, b) the client can communicate desired changes back to the server, c) it is application specific, and therefore completely extensible, how a client and server discover one another, d) it can be easily implemented.

At least one aspect of the present invention contemplates: a) any server DOM object can be shared with clients, b) the client can communicate desired object changes back to the server, c) and being application specific, and therefore completely extensible, what services can be shared. The present invention also contemplates a) defining how server and client applications find on another, b) defining how the client can communicate desired changes back to the server, c) and HTML DOM object state and behavior being shared rather than high level services.

All HTML elements used by a Web page for things such as showing a video, receiving user key, mouse or touch events, or communicating over the network may be implemented in accordance with the present invention with a standard DOM representation. Everything the user does or sees may be represented in the DOM. HTML5 may also be leveraged for JavaScript in a Web page to access this DOM information. New JavaScript can be added to the Web page that access some portion of the DOM objects representing the Web page A and user interaction to create a replica of what the user is doing and seeing.

An original Web page may remain unchanged. The selected portion of the DOM can be shared, in real time, using WebSockets or other suitable a bidirectional communication channel between a browser and a server. The information can be used by an application, for example as a measurements or verification tool. The Application and WebSocket server can collaborate to that the information from the shared DOM is accessible by another new Web page. The new Web page can change the DOM objects in other Web browser—these changes will effect what the Web browser user sees. An application bridge can be used to link a server and a client that use WebSockets (or other bidirectional communications such as XHR). The bridge can play a central role in how Web pages discover, address and communication with each other. A variety of discovery, security and other communication protocols can be provided by the bridge. The protocol used between the client and server can be custom to the application.

As supported above, one non-limiting aspect of the present invention relates to a method where a Web page executing in Web browser can be monitored and controlled, without modification to the Web page, by a Web page on another browser or an external application. The invention defines a means whereby any Web page, a MSO Electronic Program Guide on a connected TV for example, can have an arbitrary portion of itself made available to another Web pages, a TV remote control app on a smartphone for example, so that the other Web pages can be informed of, and change, the state of the shared Web page. Several example use cases of this invention are: a Web page on a smartphone controlling a EPG Web page; transferring a service such as watching a video from the TV to a tablet; multiple users sharing a Web page and collaboratively interacting with it; and a home automation Web page running on a PC gathering information from Web enabled Smart Home devices.

The method for accomplishing exposure of the Web page to be shared, as contemplated by the present invention, may always be possible, independent of the application, and without requiring modification of the Web page. The invention contemplates: 1) a Web page with state and behavior that may be made available to other Web pages. This may be called the Server Web page. 2) Web pages that have access to and can modify the shared behavior and state. These may be called Client Web pages. A single Web page can act in the role of multiple Servers for state and behavior and as multiple clients. 3) A Web page Bridge that allows Servers and Clients to find and communicate with each other. 4) A protocol between Server and Clients for expressing events and state updates. The Server, Client and Bridge components in the invention are not limited to the use of this protocol.

A Web page may become a Server in accordance with the present invention by including server script functions, for example JavaScript, that: a) detect HTML Document Object Model (DOM) events for DOM objects that are to be shared with Clients, b) connect to a Bridge to establish communication with Clients, c) send detected events to Clients, d) receive messages from Clients. A Web page may become a Client in accordance with the present invention by including client script functions, for example JavaScript, that: a) connect to a Bridge to establish communication with a Server, b) receive and act on detected events from the server, c) maintain the portion of element state shared by the Server, d) send messages back to the Server to update the shared element state. A Bridge is contemplated that: a) allows Server and Clients to connect to a globally unique instance of the bridge for purposes of bi-directional communication of messages, b) informs a Server and Clients when there are new connections to the instance of the Bridge, c) passes any message from one connection on the instance of the Bridge to all other connections, d) informs the first Server or Client on the instance of the Bridge when there are no other connections, e) uses a network protocol for Server and Client connections, WebSockets for example, that allows Server and Clients to connect to the Bridge in a manner not limited by the Internet origin of the Server and Client Web pages and the Bridge. The invention can use other network protocols supported by browsers but there may be associated Internet origin restrictions. Servers may send clients messages consisting of: the server DOM object id, the event type (as defined in the HTML5 specification), a list of (attribute, value) pairs representing the shared state for the object id. The invention defines a new event type for a server to initialize the client. Clients receive these messages and create a remote representation of the object on the server. Clients send a server messages consisting of: the server object id, (attribute, value) pairs, object method names. The server uses these messages to update the DOM object.

The invention allow Script Functions to monitor and control a Web page without modifying the Web page. The invention introduces the idea of a bridge, independent of the Web server, that allows Web client applications to communicate with one another. This is a critical difference from an implementation that relies on a Web server backend application to create the client connections because the invention allows the Web page developer to add script to the web client for communication. This can then be delivered by any standard Web server without server side intervention. The invention also allows clients served from completely independent Web servers to communicate; something not possible if the page server is making the bridge. The invention shows how a protocol over this communication path can be used to link the state of DOM objects among the clients. The client applications do not have to be modified to interact.

The Web server/browser model contemplated by the present invention may be applied to delivering applications in diverse areas such as multimedia service, Internet of things and collaboration. These types of applications may desire the use of one Web page to communicate with another Web page for purposes such as remote control and sharing of information. The present invention contemplates a means for one Web page to create a window in another Web page and serve Web content to that window, however, the process describe above may be preferred because: a) the client knows what is being shared by virtue of the Bridge name, b) the client can communicate desired changes back to the server, c) it is application specific, and therefore completely extensible, how a client and server discover one another, d) it can be easily implemented.

At least one aspect of the present invention contemplates: a) any server DOM object can be shared with clients, b) the client can communicate desired object changes back to the server, c) and being application specific, and therefore completely extensible, what services can be shared. The present invention also contemplates a) defining how server and client applications find on another, b) defining how the client can communicate desired changes back to the server, c) and HTML DOM object state and behavior being shared rather than high level services.

All HTML elements used by a Web page for things such as showing a video, receiving user key, mouse or touch events, or communicating over the network may be implemented in accordance with the present invention with a standard DOM representation. Everything the user does or sees may be represented in the DOM. HTML5 may also be leveraged for JavaScript in a Web page to access this DOM information. New JavaScript can be added to the Web page that access some portion of the DOM objects representing the Web page A and user interaction to create a replica of what the user is doing and seeing.

An original Web page may remain unchanged. The selected portion of the DOM can be shared, in real time, using WebSockets or other suitable a bidirectional communication channel between a browser and a server. The information can be used by an application, for example as a measurements or verification tool. The Application and WebSocket server can collaborate to that the information from the shared DOM is accessible by another new Web page. The new Web page can change the DOM objects in other Web browser—these changes will effect what the Web browser user sees. An application bridge can be used to link a server and a client that use WebSockets (or other bidirectional communications such as XHR). The bridge can play a central role in how Web pages discover, address and communication with each other. A variety of discovery, security and other communication protocols can be provided by the bridge. The protocol used between the client and server can be custom to the application.

One non-limiting aspect of the present invention contemplates a Web application on a smartphone or other mobile device may be used as a client for HTML5 based services and can transfer a service session to another HTML5 based client, e.g. TV, for viewing. All service enablements and authentication may stay with the application on the smartphone. The idea is to deliver cable services to an individual's smartphone and enable the smartphone to project those services, session by session, onto delivery platforms like TVs or STBs. Services become tied to individuals using the smartphone platform that is already accepted as an individual's personal device. Services start on the individual's personal device and only temporarily get pushed somewhere else. The implementation may be a Web browser, an HTML5 RUI client or other feature associated with the smartphone. Via the above-described capabilities to transfer services and special instructions between devices, the user can transfer a smartphone session to any other HTML5 RUI client, such as a connected TV or STB. A transferred session includes authorization information from the smartphone to the TV or STB that is in turn sent by the TV or STB to the MSO's network. This may be beneficial in accomplishing that at least two things: 1) enables the MSO to authenticate sessions that are transient in nature and 2) services are still delivered directly to the TV and STB. The user's personal device can continue to be involved in transferred session as dictated by the MSO's RUI application, for example as remote control.

This idea can be used within the MSO user's home and could also be enabled by the MSO to work in other venues. For example, when visiting your neighbor you could watch your channels on their TV. When you leave, this capability leaves with you. One non-limiting aspect of the present invention contemplates the following sequence:

1) User accesses their Cable Service from their smartphone. User can interact with the services on their phone. User decides to transfer the session to the TV.

2) User enters URL for the MSO Remote Session Web page on the TV.

3) The MSO Program Guide web page connects to the MSO Remote Session Web page, for example via a web socket bridge. MSO Program Guide Web page creates a session key, using information specific to the MSO Remote Session Web page and possibly using information from the MSO Web server that has visibility of both running Web pages. MSO Program Guide Web page sends a URL to MSO Remote Session Web page. The URL consists of the content URL on the smartphone that is to be transferred and the session key that authenticates the MSO Remote Session Web page on the TV to the MSO.

4) The MSO Remote Session Web page requests the content using the URL+session key.

5) The MSO Web server delivers the content after authenticating the session key. The MSO will deliver the content using content protection appropriate for the TV, which may be different than the smartphone.

At the end of the session, which is under complete control of the MSO Web server, no residual enablement or authentication information may be left in the TV.

One non-limiting aspect of the present invention contemplates a personal device or mobile device logging on to acquire security credentials. This process may correspond with:

1) Mobile device Web browser requests VoD page from the service provider. No SecurityToken cookie exists.

2) Service provider returns Web page that requires user to login to acquire SecurityToken cookie.

3) Mobile device Web page sends username/password.

4) Service provider responds to set SecurityToken in mobile device browser.

5) Mobile device Web page re-requests VoD page with SecurityToken. Service provider provides page.

One non-limiting aspect the present invention contemplates and advertisement and discovery process. This process may correspond with:

1) TV (or other display device) Web browser requests Web page that enables the device to receive services from a personal device. No user authentication is necessary with the Service Provider.

2) TV Web page advertises its ability to receive applications from the personal device by opening a WebSocket connection to the WebSocket Server. This may be done automatically or in response to a TV user action. The TV Web page sends "Device Name":"Application Name". "Device Name" uniquely identifies this TV. It may be a cookie in the browser or some other mechanism. "Application Name" identifies the type of the application or set of applications that can be received by this type of TV Web page.

3) Personal device requests service provider Web page containing one or more applications.

4) Personal device sends an AJAX request, e.g. http://someurl?apptype=ApplicationName. A similar message could be sent over some other similar communication channel. The request is for all "Device Names" that have opened WebSocket connections and have used the same "Application Name". The WebSocket Server creates a response to the request using the concept of "location" to filter which "Device Names" it should respond with. In this example, "location" is the public IP address used by the TV and the personal device. The WebSocket Server will only respond with "Device Names" if the TV has the same public IP address as the personal device, which the WebSocket Server can determine from the information in the WebSocket protocol. This is a useful because it equates to a case where all devices in the same house share a public IP address provided to them by a DSL, cable modem or fiber-to-the-home service. "Location" could also be some other identifier commonly agreed to by the creators of the TV Web page, personal device Web page and WebSocket Server. The essential purpose of "location" is to define the scope of devices discovered by the personal device.

5) The WebSocket Server responds with the list of "Device Names" that have the same "Application Name" as in the request and where the "location" of the devices and requesting personal device are the same.

One non-limiting aspect of the present invention contemplates authorizing application content use on non-authorized televisions. The authorization may correspond with:

1) Mobile device Web page requests application or media item identified by 'ApplicationId' or 'MediaId', respectively. The request includes the mobile device's SecurityToken cookie.

2) Service Provider generates 'ApplicationToken' or 'MediaToken' that represents a temporary authentication to access the application or media item identified by 'ApplicationId' or 'ContentId'.

3) Mobile device Web page user selects a shared device to be used for executing the application or playing the media item.

4) Mobile device Web page sends a request to the SharedDOM administrator 'Admin' in the TV Web page to load an application or play the media item identified by 'ApplicationToken' or 'MediaToken'.

5) TV Web page requests to load the application or play the media item represented by 'ApplicationToken' or 'MediaToken'.

6) Service provider verifies that the supplied token is valid for the requested use. If it is, the Service Provider responds to the TV Web page with an 'ApplicationURL' or 'MediaURL'.

7) 'Admin' creates the appropriate DOM object in the TV Web page, depending on the request. For example, it might create an iframe HTML element to load an application or a video HTML5 element to play a content item.

8) Newly created DOM object loads the 'ApplicationURL' or 'MediaURL'.

One non-limiting aspect of the present invention contemplates a method so that input from a touch and gesture enabled browser can be used to navigate on another Web page executing in a browser that does not support touch and gesture input. This may include a first Web page executing in a browser that supports touch input from the touch enabled device on which the browser is running. The Web page may capture an arbitrary set of touch inputs (defined by the Web page author) and send commands to another Web page; one command per touch input event. A first set of JavaScript functions for creating and positioning a visible cursor in a second Web page may be created such that user input on the first Web page translates into correct cursor behavior in the second Web page. These JavaScript functions may also provide a means to determine cursor "focus", i.e. identify the DOM object in the second Web page to which user input on the first Web page such as "touch" or "two finger swipe" applies. A second set of JavaScript functions for manipulating the DOM in the second Web page may be created so that user input captured by the first set of JavaScript functions results in transformation of the DOM of the second Web page equivalent to what would have happened if the user had been able to use touch input directly on the second Web page. The first Web page may capture to facilitate the capture of the following touch and gesture events: TouchesBegan, TouchesMoved, TouchesEnded, TouchesCancelled, GestureBegan, GestureChanged and/or GestureEnded Touches may be used to represent the positions and movements of individual fingers on the screen. Gestures may be used to represent the changes in distance between touch points (zoom) and the change of the angle of one touch point relative to the other (rotation). Optionally, all Touch and Gesture events may be transmitted verbatim from the first Web page to the second Web page. Because the Touch and Gesture events may be transmitted verbatim from the first Web page, interpretation of these events may be entirely the domain of the second Web page. This may provide for a degree of flexibility when developing applications for the second Web page also allowing the JavaScript application on the first Web page to remain generic. For example, remote cursor activity may be initiated on the first Web page by pressing and holding a finger in the screen for a predetermined amount of time. The second Web page may then detect when this interval elapses such that a virtual cursor will appear on the second Web Page. The virtual cursor can be represented on the second Web page in a variety of ways, which for exemplary non-limiting purposes may be described as a bright colored glowing ring.

The first set of JavaScript functions on the second Web page may interpret touch and gesture events as follows:

1. The TouchesMoved events may be interpreted in one of two ways: If the virtual cursor is active (see above), the cursor will move across the screen of the second Web page in a proportional manner to the position of the finger on the first screen. If the virtual cursor is not active, then normal scrolling of the application on the second Web page will occur.

2. The TouchesEnded event may be interpreted in one of two ways: If the virtual cursor is active, this will be interpreted as a click event on the html element under the virtual cursor. If the virtual cursor is not active, then the scroll operation in progress, if any, is ended.

3. The TouchesCancelled may cancel any touch sequence in progress. This can occur for reasons such as a phone call is received.

4. GestureEvents may be interpreted in an application specific manner, but the standard implementations are zooming and rotating the element under the first touch position.

A "Drag and Drop" may be indicated on the second Web page by applying a second finger (touch) on the first Web page (without lifting the first finger) while the cursor on the second Web page is over the element to be dragged. The virtual cursor on the second Web page may change to represent a drag cursor. Lifting both fingers on the first Web page may cause a touch event to be sent to the second Web page which is interpreted as an indication to drop the element. Keyboard input to elements on the second Web page may be addressed according to the various operations contemplated by the present invention. A click on the text input element may cause the first Web page to collect keyboard input. Each key press associated with the first Web page may be used to update the DOM element's value attribute on the second Web page. Additionally, each key press may cause invocation of the onKeyPress event handlers on the second Web page.

The second set of JavaScript functions, using the first set of JavaScript functions to determine the input event and DOM object focus, may identify the target element for the touch and gesture event on the second Web page through a coordinate translation. The touch positions on the first screen may be converted to factors of 0.0-1.0, representing the location (x,y) on the screen relative to the size if the screen. These values may be applied to the size of the second Web Page, which may optionally result in absolute positions on the second screen that are proportional to the positions on the first screen. The deficiencies of traditional TV remote controls to facilitate navigating Web page display within a television may be ameliorated with the navigational capabilities associated with the present invention. While the present invention contemplates facilitating the touchscreen manipulation with the use of keyboard and mouse TV remotes, the use of such remotes may be less beneficial than the touchscreen manipulation as such remotes may have poor human factors for TV users. This invention enables use of widely deployed devices with a broadly accepted input paradigm for navigation of TV Web pages by defining a software design that can be used on all touch enabled devices with a Web browser to facilitate capturing touch to control a Web page on any TV or other display device.

One non-limiting aspect the present invention contemplates a Touch Device browser loading a Web page consisting of a touch screen image, a first set of JavaScript functions for capturing touch events and shared DOM administration JavaScript functions. Each touch event may be detected by the first set of JS functions and reported as a message (via the admin functions) to the Display Device Browser. Each message may contain the specific touch event along with the x, y coordinates where the touch event happened and the maximum x, y dimensions of the touch screen. In this example, a touch start and a touch move event is reported. The Display Device browser may load a Web page consisting of the application user interface objects, for example a set of images representing movies that can be viewed. The Web page also includes JavaScript functions for creating a visual representation of the touch event and location from the touch device browser on the display device browser. In this example, these functions may create a bubble in the same relative position as the user's finger on the touch device. It is possible that the functions would create some other representation—it is up to the function implementation.

The Display Device Browser Web page may also include JavaScript or other suitable functions for determining and informing the user which user interface element is being selected by the representation of the touch event. In this example, the functions highlight the selected user interface object by changing its background color. Other mechanisms for informing the user are possible, for example speaking the title of the selected element. This set of functions may be responsible for determining what touch event corresponds to the 'selection' of a user interface element. In this example, the touchend event denotes selection of the highlighted image. This selection may invoke the same functionality as would normally be invoked by a mouse click.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for remotely controlling a presentation playing within a first Web page of a receiving user agent operating on a first device from a second device operating independently of the first device, the method comprising:
   determining one or more of a plurality of objects for a document object model (DOM) generated at the receiving user agent to enable display of the first Web page, the plurality of objects being used with the first Web browser to facilitate playing the presentation within the first Web page, the plurality of objects including a presentation object associated with streaming or downloading the presentation from a Web server to the receiving user agent and a presentation control object associated with controlling playback of the presentation, the presentation control object including a presentation function sufficient to instigate playing of the presentation when set to a first attribute and to pause playing of the presentation when set to a second attribute;
   determining the presentation function to be set to the first attribute at a first instance as a function of instructions included in a menu message wirelessly transmitted directly from the receiving user agent to the second device, the menu message traveling from the first device to the second device without being received at the Web server;
   presenting a control menu on a controlling user agent of the second device in response to receipt of the menu message, the control menu having one or more selectable buttons with a first button of the one or more selectable buttons indicating the presentation function to be set to the first attribute;
   determining a user actuation of the first button at the second device indicating a desire to control the presentation function from the first attribute to the second attribute; and
   transmitting a control message from the second device to the first device in response to the desire to cause the receiving user agent to change the presentation function from the first attribute to the second attribute, thereby pausing play of the presentation.

2. The method of claim 1 further comprising presenting the control menu and determining the user actuation without contemporaneously displaying the presentation on the second device.

3. The method of claim 2 wherein the first device is a television and the second device is a tablet and the television and the tablet communicate over a local area network (LAN), and wherein the method further comprises transmitting the control message through a connection constructed over the LAN between the first device and the second device such that the control message travels from the tablet over the LAN through the connection for receipt at the television and without traveling further than the LAN.

4. The method of claim 3 further comprising:
   transmitting the control message through the connection without the control message being transmitted to the Web server; and
   pausing play of the presentation within the first Web page in response to receipt of the control message and without re-loading the first Web page such that the presentation function changes from the first attribute to the second attribute without the Web server correspondingly specifying the first or second attributes and without the Web server otherwise making adjustments to the plurality of objects.

5. The method of claim 3 further comprising:
   transmitting the control message to the receiving user agent from the controlling user agent;
   presenting a transfer button within the control menu as one of the one or more selectable buttons;
   determining a transfer actuation of the transfer button in response to the user engaging the transfer button, the transfer actuation indicating the user desiring to subsequently playback the presentation via the second device;
   transmitting a transfer message from the tablet to the television in response to the transfer actuation, the transfer message causing the television to thereafter transfer the presentation through the connection to the controlling user agent for playback through the tablet such that play of the presentation thereafter appears on the tablet to be paused; and
   determining a user actuation at the tablet sufficient to begin playback of the presentation, and thereafter, instructing the television to continue transferring the presentation over the connection for subsequent playback at the tablet while the presentation is being contemporaneously streamed or downloaded to the television from the Web server, thereby playing the presentation through the tablet without the tablet contemporaneously streaming or downloading the presentation from the Web server.

6. The method of claim 1 further comprising initially presenting the control menu without contemporaneously displaying the presentation object at the second device.

7. The method of claim 1 further comprising:
   presenting the control menu with the first button having a play icon to convey the presentation function;
   visually varying the first button from the play icon to a pause in response to receipt of the menu message; and
   determining the user actuation to correspond with user selection of the pause icon.

8. The method claim 6 further comprising visually varying the first button from the pause icon to the play icon to indicate the receiving user agent having changed the presentation function from the first attribute to the second attribute.

9. The method claim 7 further comprising varying the first button from the pause icon to the play icon in response to the second device receiving an updated menu message transmitted from the first device confirming change of the presentation function from the first attribute to the second attribute.

10. The method claim 7 further comprising varying the first button from the pause icon to the play icon automatically upon transmission of the control message to the first device such that the first button is changed from the pause icon to the play icon without requiring confirmation from the first device of the presentation function being change from the first attribute to the second attribute.

11. The method of claim 1 further comprising changing the presentation function from the first attribute to the second attribute in response to the control message using the receiving user agent, including the receiving user agent changing from the first attribute to the second attribute:
without correspondingly downloading or re-downloading the first Web page from the Web server;
without correspondingly downloading or re-downloading the presentation function from the Web server; and
without correspondingly re-populating the presentation function according to instructions or other information provided from the Web server.

12. A Web browsing system comprising:
a first device having a processor and a first plurality of instructions stored on a first non-transitory computer-readable medium, the first processor executing the first plurality of instruction to implement a receiving user agent, the receiving user agent operable to enable download of a first Web page from a Web server, the first Web page being sufficient to facilitate playback of a presentation from the Web server, the receiving user agent including:
i) a first Web browser configured to process the first Web page for playing of the presentation;
ii) a first document object model (DOM) having a plurality of first DOM objects associated with rendering the first Web page, at least some of the first DOM objects having controllable attributes and at least some of the first DOM objects having non-controllable attributes, the first DOM operable for varying the presentation playing within the first Web page according to changes in the controllable attributes;
iii) a first human computer interface (HCI) for changing one or more of the controllable attributes as a function of user interaction;
iv) a first administration agent configured to differentiate the controllable and non-controllable attributes and specify one or more of the controllable attributes within a menu message, including specifying a first value for a first controllable attribute of the one or more controllable attributes; and
v) a first bridge computer interface (BCI) operable for:
(1) transmitting the menu message through a connection; and
(2) changing one or more of the controllable attributes as a function of a control message received through the connection;
a second device having a second processor and a second plurality of instructions stored on a second non-transitory computer-readable medium, the second processor executing the second plurality of instruction to implement a controlling user agent to enable download of a second Web page to facilitate controlling playback of the presentation at the first Web browser, the controlling user agent including:
i) a second Web browser configured to process the second Web page for visualizing of a control menu;
ii) a second document object model (DOM) having a plurality of second DOM objects associated with rendering the control menu, at least some of the second DOM objects having controllable menu attributes, the second DOM operable varying the control menu according to changes in the corresponding controllable menu attributes;
iii) a second HCI operable to facilitate changing one or more of the controllable menu attributes rendered in the control menu as a function of user interaction;
iv) a second administration agent configured to:
(1) set one or more of the controllable menu attributes rendered in the control menu to match the controllable attributes specified within the menu message, including setting the first controllable menu attribute of the controllable menu attributes to the first value specified in the menu message;
(2) determining user interaction with the control menu sufficient to change the first controllable menu attribute from the first value specified in the menu message to a second value; and
(3) generate the control message with instructions sufficient for instructing the receiving user agent to change the first controllable attribute from the first value to the second value;
v) a second BCI operable to facilitate receiving the menu message and transmitting the control message through the connection, the control message causing the receiving user agent to change the first controllable attribute from the first value to the second value and correspondingly vary the presentation playing in the first Web page, thereby enabling the controlling user agent to vary the presentation playing in the first Web page without visually presenting or otherwise displaying the presentation.

13. The system of claim 12 wherein the first administration agent changes the first controllable attribute from the first value to the second value without requiring the receiving user agent to contemporaneously download the Web page or the control message from the Web server and without the receiving user agent requesting the Web server to correspondingly re-populate the first DOM objects.

14. The system of claim 13 wherein the connection is a Web socket configured to facilitate signaling between the receiving user agent and the controlling user agent independently of the Web server such that the first BCI receives the control message without contemporaneously communicating with the Web server.

15. The system of claim 13 wherein the first administration agent is configured to specify the one or more controllable attributes within the menu message and not the non-controllable attributes, the controllable attributes being operable between multiple states whereas the non-controllable attributes are inoperable between multiple states.

16. The system of claim 15 wherein:
the second HCI displays a transfer button within the second Web page;
the second administration agent transmits a transfer message through the connection upon determining user selection of the transfer button; and
the first administration agent transfers the presentation through the connection for presentation through the second Web page in response to the transfer message, wherein the first administration agent transfers the presentation through the bridge independently of the Web server such that the presentation is presented in the second Web page without being transmitted thereto from the Web server.

* * * * *